(12) United States Patent
Asahara

(10) Patent No.: US 6,612,279 B2
(45) Date of Patent: Sep. 2, 2003

(54) VIBRATION REDUCING SYSTEM FOR INTERNAL COMBUSTION ENGINE

(75) Inventor: Yasuyuki Asahara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/819,015

(22) Filed: Mar. 28, 2001

(65) Prior Publication Data

US 2002/0011229 A1 Jan. 31, 2002

(30) Foreign Application Priority Data

Mar. 28, 2000 (JP) ........................................ 2000-088097
Sep. 26, 2000 (JP) ........................................ 2000-293027

(51) Int. Cl.$^7$ .............................................. F02B 75/06
(52) U.S. Cl. ...................................... 123/192.1; 74/574
(58) Field of Search ........................ 123/191.2, 191.1; 74/574

(56) References Cited

U.S. PATENT DOCUMENTS

| | | | | |
|---|---|---|---|---|
| 4,881,426 A | * | 11/1989 | Serizawa et al. | ............. 74/574 |
| 5,303,681 A | * | 4/1994 | Crofts | ..................... 123/192.1 |
| 5,405,296 A | * | 4/1995 | Cerny et al. | ................. 474/135 |
| 5,704,839 A | * | 1/1998 | Michael et al. | ................ 464/89 |
| 5,931,052 A | * | 8/1999 | Zhao et al. | .................... 74/574 |
| 6,085,723 A | * | 7/2000 | Pels et al. | .............. 123/339.24 |

FOREIGN PATENT DOCUMENTS

| | | |
|---|---|---|
| JP | 6-33990 | 2/1994 |
| JP | 11-325186 | 11/1999 |

* cited by examiner

Primary Examiner—Noah P. Kamen
(74) Attorney, Agent, or Firm—Foley & Lardner

(57) ABSTRACT

A vibration reducing system for an automotive internal combustion engine vehicle. The vibration reducing system comprises an elastic member, and a rotating member driven through the elastic member by a rotating shaft of the engine. Here, the elastic member and the rotating member are arranged such that one of frequencies obtained by multiplying a rotational frequency of the rotating shaft of the engine which is operated idling engine operating condition by a value (a natural number/2) is within a range between a frequency of antiresonance for a rotational fluctuation of the rotating shaft of the engine which antiresonance is generated under a resonance generated by the elastic member and the rotating member and a frequency of antiresonance for roll vibration of the engine which antiresonance is generated under a resonance generated by the elastic member and the rotating member.

22 Claims, 40 Drawing Sheets

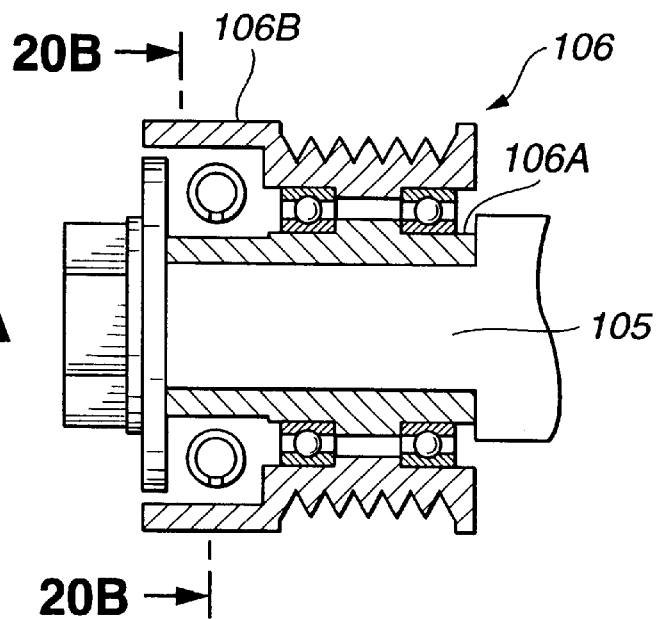
FIG. 20A
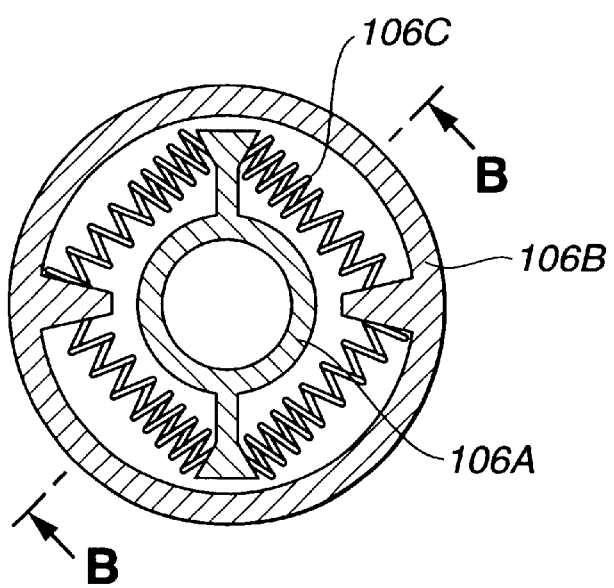
FIG. 20B
FIG. 21
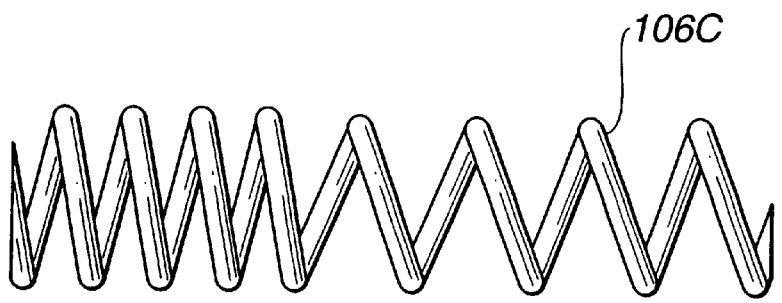

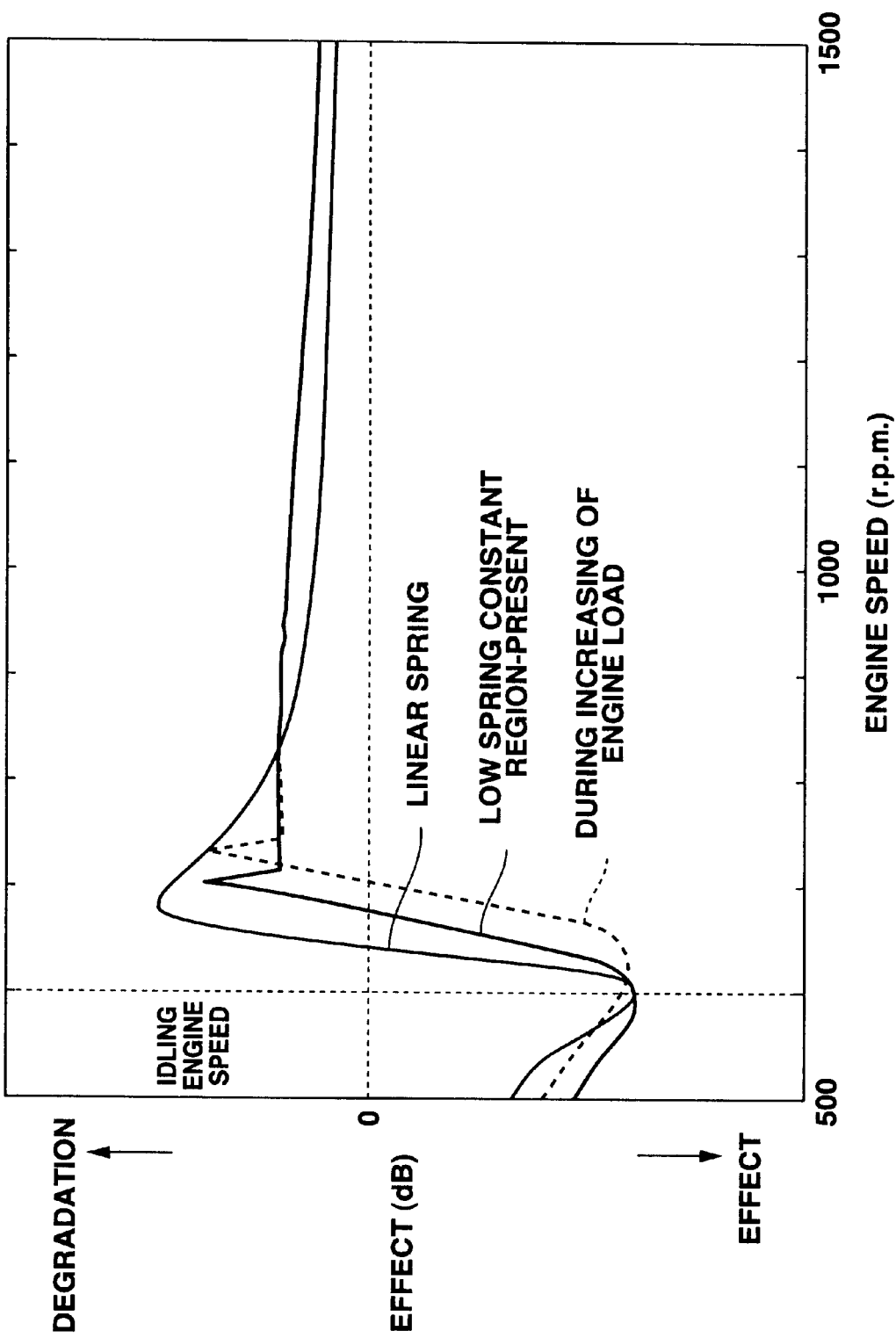

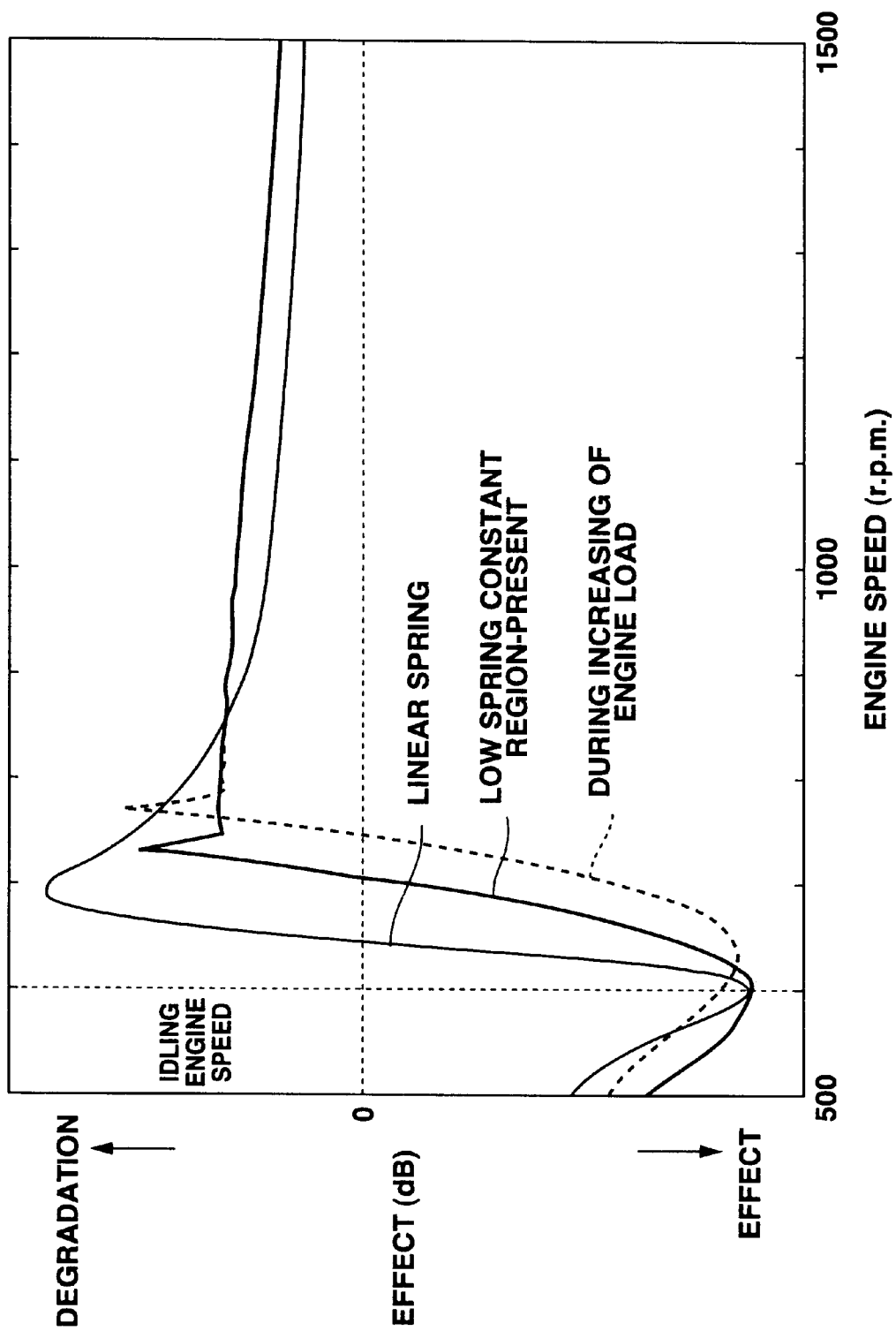

VIBRATION REDUCING SYSTEM FOR INTERNAL COMBUSTION ENGINE

BACKGROUND OF THE INVENTION

This invention relates to improvements in a vibration reducing system for internal combustion engines mounted on automotive vehicles, which is intended for reducing vibrations of an internal combustion engine due to fluctuations in combustion pressure, and more particularly, to a vibration reducing system for internal combustion engines, which effectively reduces both roll vibration and rotational fluctuations in an internal combustion engine.

Hitherto, a vibration reducing system for internal combustion engines has been proposed in Japanese Patent Provisional Publication No. 6-33990. In this proposition, a sub-flywheel system is provided to an engine in addition to a main flywheel system including a crankshaft and a flywheel so as to be rotatingly driven in a direction opposite to the direction of rotation of the main flywheel system. A roll moment is generated by reaction forces exerted on bearing portions of these two flywheel systems. Use of this roll moment cancels roll vibration which is a vibration in a direction of rotation about a longitudinal axis of an internal combustion engine, produced by torque fluctuations generated every combustion in respective cylinders of the internal combustion engine.

SUMMARY OF THE INVENTION

With the above conventional arrangement, the condition for fully canceling roll vibration of an internal combustion engine is represented by the following formula (1):

$$I_1 = \rho I_2 \tag{1}$$

where $I_1$ is an inertial mass of the main flywheel system; $I_2$ is an inertial mass of the sub-flywheel system; and $\rho$ is a speed increasing ratio of a sub-flywheel system.

A large roll vibration reducing effect can be obtained in the vicinity of such a condition. However, since the main flywheel system inherently has a large inertial mass $I_1$, it is necessary to adequately increase the inertial mass $I_2$ of the sub-flywheel system or ensure a large speed increasing ratio $\rho$ as apparent from the above formula (1), in order to fully cancel the inertial mass $I_1$ of the main flywheel system. However, a large-sized sub-flywheel is necessary in order to increase the inertial mass $I_2$ of the sub-flywheel system, which will incur an increase in weight of an entire engine. Also, when the speed increasing ratio is made large, bearing portions of the sub-flywheel system, which rotates at high speeds, will be degraded in durability. Because of these various factors, the above-mentioned device cannot fully cancel roll vibration of an internal combustion engine, and is limited in its effect.

Additionally, with the above conventional arrangement, although it is possible to reduce roll vibration of an engine, there is a problem that rotating fluctuations of an engine rotating shaft (crankshaft) cannot be reduced.

Therefore, it is an object of the present invention to provide an improved vibration reducing system for an internal combustion engine, by which drawbacks encountered in conventional vibration reducing systems can be effectively overcome.

Another object of the present invention is to provide an improved vibration reducing system for an internal combustion engine, which can effectively reduce both roll vibration and rotational fluctuations generated in the internal combustion engine.

A further object of the present invention is to provide an improved vibration reducing system for an internal combustion engine, which can effectively reduce engine vibrations while sharply reducing booming noise generated in a passenger compartment in a vehicle during idling of the engine.

An aspect of the present invention resides in a vibration reducing system for an internal combustion engine, comprising an elastic member, and a rotating member driven through the elastic member by a rotating shaft of the engine. Here, the elastic member and the rotating member are arranged such that one of frequencies obtained by multiplying a rotational frequency of the rotating shaft of the engine which is operated in a predetermined engine operating condition where an engine speed is generally constant by a value (a natural number/2) is within a range between a frequency of antiresonance for a rotational fluctuation of the rotating shaft of the engine which antiresonance is generated under a resonance generated by the elastic member and the rotating member and a frequency of antiresonance for roll vibration of the engine which antiresonance is generated under a resonance generated by the elastic member and the rotating member. It will be understood that the above range contains the frequency of antiresonance for the rotational fluctuation and the frequency of antiresonance for the roll vibration.

Another aspect of the present invention resides in a vibration reducing system for an internal combustion engine, comprising a rotational vibration system including an elastic member, and a rotating member driven through the elastic member by a rotating shaft of the engine, the rotational vibration system generating resonance having a frequency of resonance. Here, the elastic member and the rotating member are arranged to select the frequency of resonance in a manner that one of frequencies obtained by multiplying a rotational frequency of the rotating shaft of the engine which is operated in a predetermined engine operating condition where an engine speed is generally constant by a value (a natural number/2) is within a range between a frequency of antiresonance for a rotational fluctuation of the rotating shaft of the engine which antiresonance is generated under the resonance generated by the rotational vibration system and a frequency of antiresonance for roll vibration of the engine which antiresonance is generated under the resonance generated by the rotational vibration system.

A further aspect of the present invention resides in a vibration reducing system for an internal combustion engine, comprising an elastic member, and a rotating member driven through the elastic member by a rotating shaft of the engine. Here, the elastic member and the rotating member are arranged such that one of frequencies obtained by multiplying a rotational frequency of the rotating shaft of the engine which is operated in a predetermined engine operating condition where an engine speed is generally constant by a value (a natural number/2) is within a range between a frequency of antiresonance for a rotational fluctuation of the rotating shaft of the engine which antiresonance is generated under a resonance generated by the elastic member and the rotating member and a frequency of antiresonance for roll vibration of the engine which antiresonance is generated under a resonance generated by the elastic member and the rotating member. The vibration reducing system further comprises a drive rotational inertial mass member and a driven rotational inertial member corresponding to the rotating member. The drive and driven rotational inertial mass members are relatively rotatably connected through the elastic member. The drive and driven rotational inertial mass members and the elastic member constituting a rotational vibration system and forming part of a driving force transmitting mechanism through which a rotational driving force of the rotating shaft of the engine is transmittable. Here, antiresonance is generated in the rotational vibration system between vibration in the rotational vibration system and rotational vibration at a predetermined frequency range generated under operation of the engine. Additionally, a spring force of the elastic member has a non-linear characteristics relative to a relative rotational angular displacement between the drive and driven rotational inertial mass members. The spring force of the elastic member has a characteristics to increase with an increase in the relative rotational angular displacement.

BRIEF DESCRIPTION OF THE DRAWINGS

In the drawings, the same or like reference numerals designate the same or like parts and elements throughout all figures in which*

FIG. 20A is a schematic sectional view of an alternator pulley of the alternator of FIG. 19, taken in the direction of arrows substantially along the line B—B of FIG. 20B;

FIG. 20B is a schematic sectional view taken in the direction of arrows substantially along the line 20B—20B of FIG. 20A;

FIG. 21 is a side view of a coil spring used in the alternator pulley of FIGS. 20A and 20B;

FIG. 44 is a graph showing the relationship between the engine speed and the effects in connection with the fourteenth embodiment of the vibration reducing system;

FIG. 47 is a graph showing the relationship between the engine speed and the effects in connection with the fifteenth embodiment of the vibration reducing system.

DETAILED DESCRIPTION OF THE INVENTION

Figure 1:
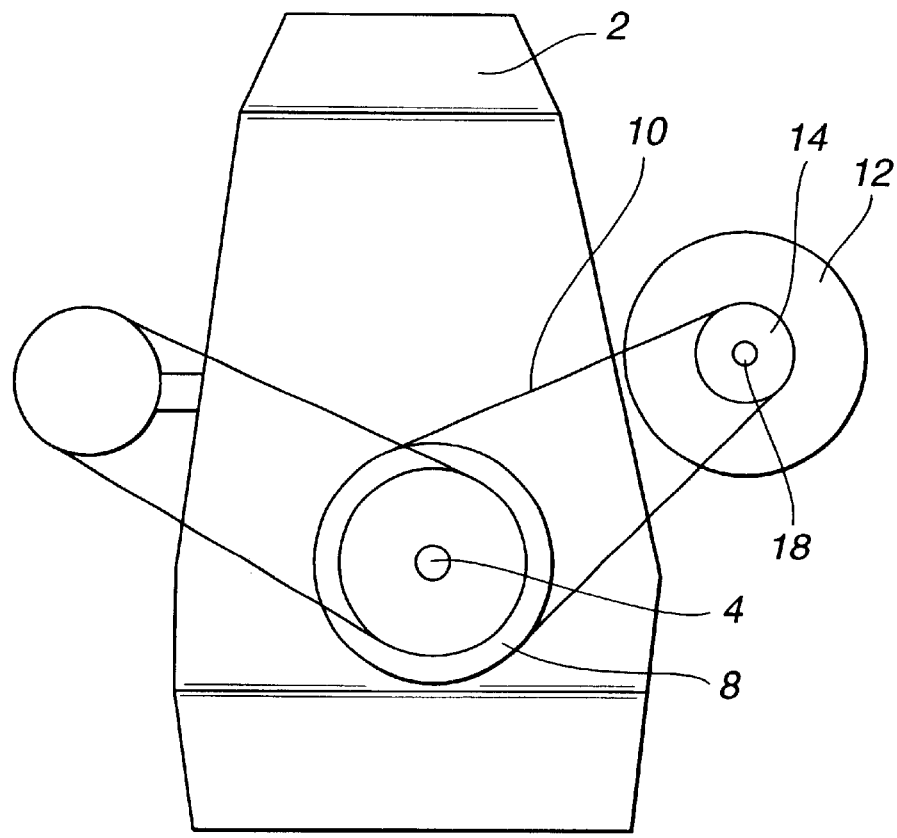
FIG. 1 is a schematic front view of an internal combustion engine provided with a first embodiment of a vibration reducing system according to the present invention.
Figure 2:
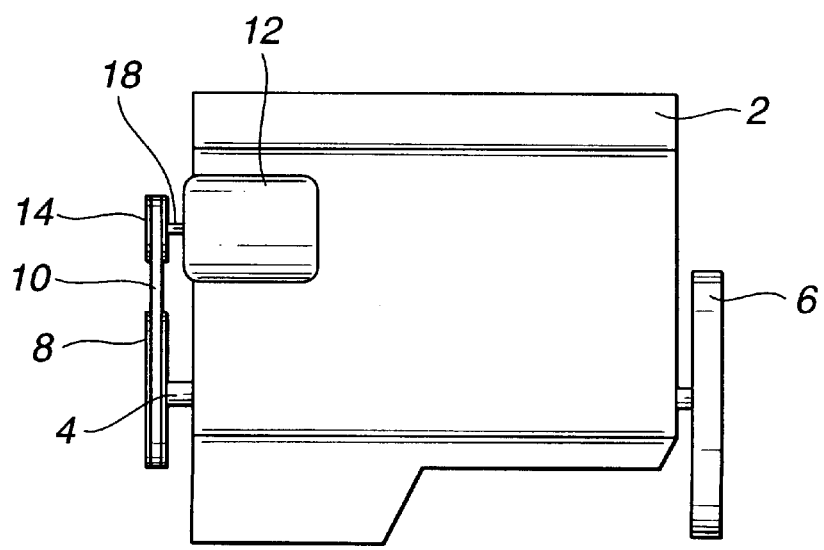
FIG. 2 is a schematic side view of the engine of FIG. 1.
Figure 3:
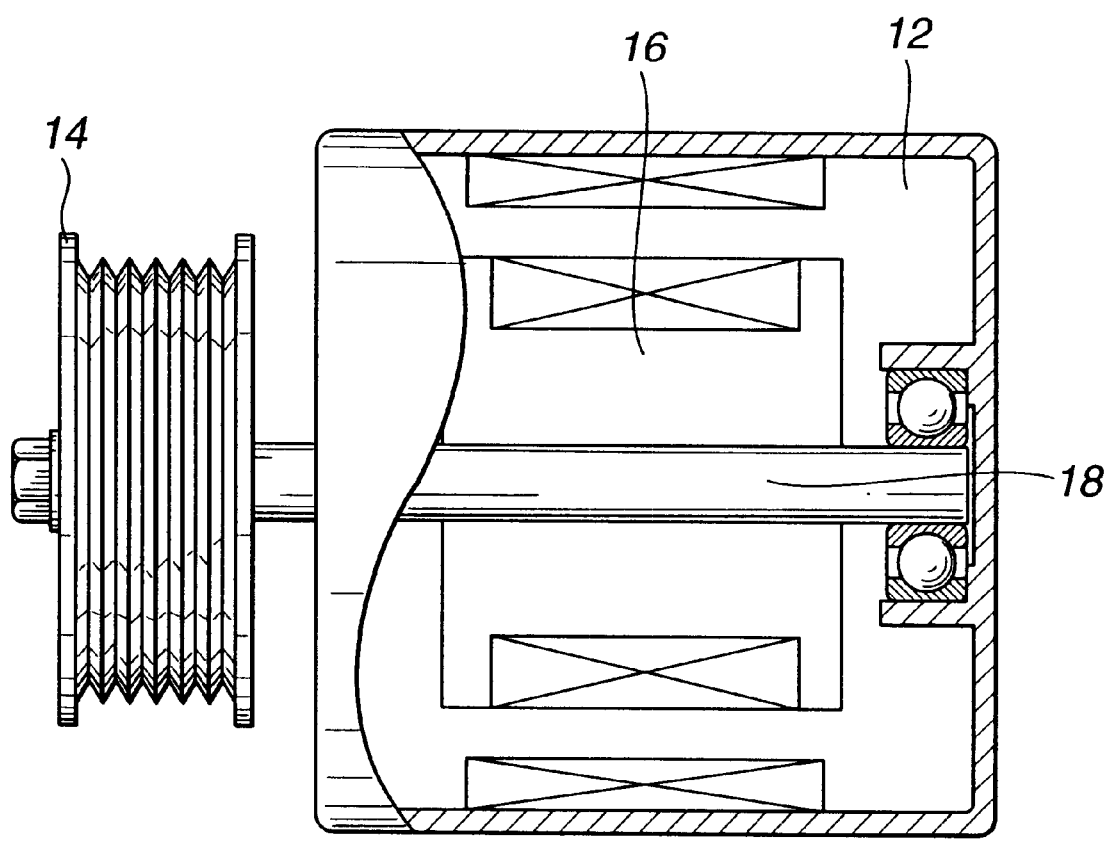
FIG. 3 is a schematic side view, partly in section, of an alternator used in the engine of FIG. 1.

Referring now to FIGS. 1 to 6 of the drawings, an internal combustion engine 2 is shown to be provided with or incorporate therewith a first embodiment of a vibration reducing system (no numeral) according to the present invention. The engine of this instance is for an automotive vehicle and of four-cylinder type. The engine is provided with engine rotating shaft (crankshaft) 4, as shown in FIGS. 1 and 2. Rotating shaft 4 has one end section on which flywheel 6 is fixedly mounted, and the other end section on which crank pulley 8 is fixedly mounted. The engine is provided with alternator 12 having alternator pulley 14. Alternator pulley 14 is shown in FIG. 3 and arranged to be rotated in the same direction as that of engine rotating shaft 4 through drive belt 10 passed or trained on pulley 8 and alternator pulley 14. In FIG. 3, reference numeral 16 designates a rotor portion 16 of alternator 12.

Figure 4:
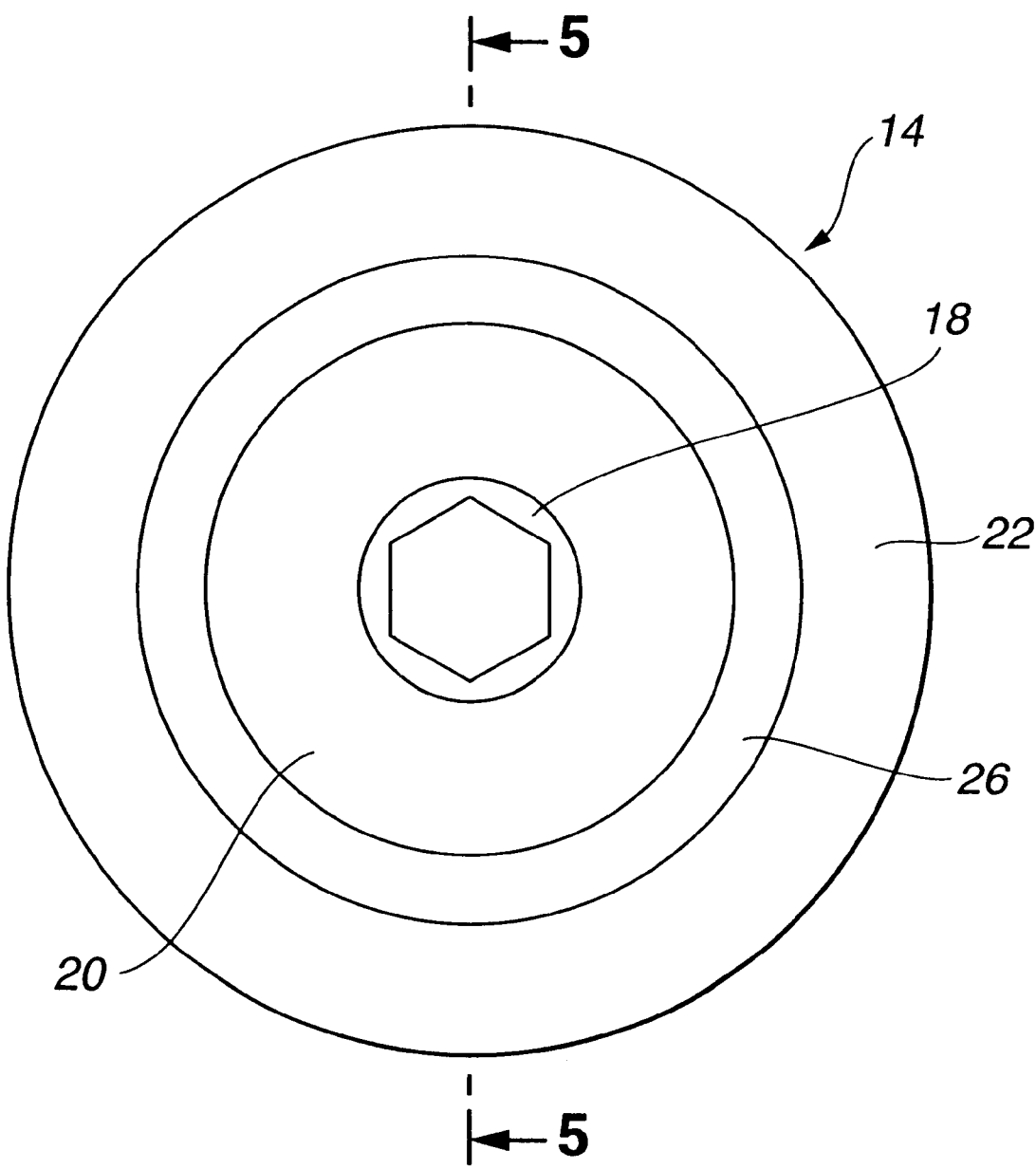
FIG. 4 is a schematic front view of an alternator pulley of the alternator of FIG. 3.
Figure 5:
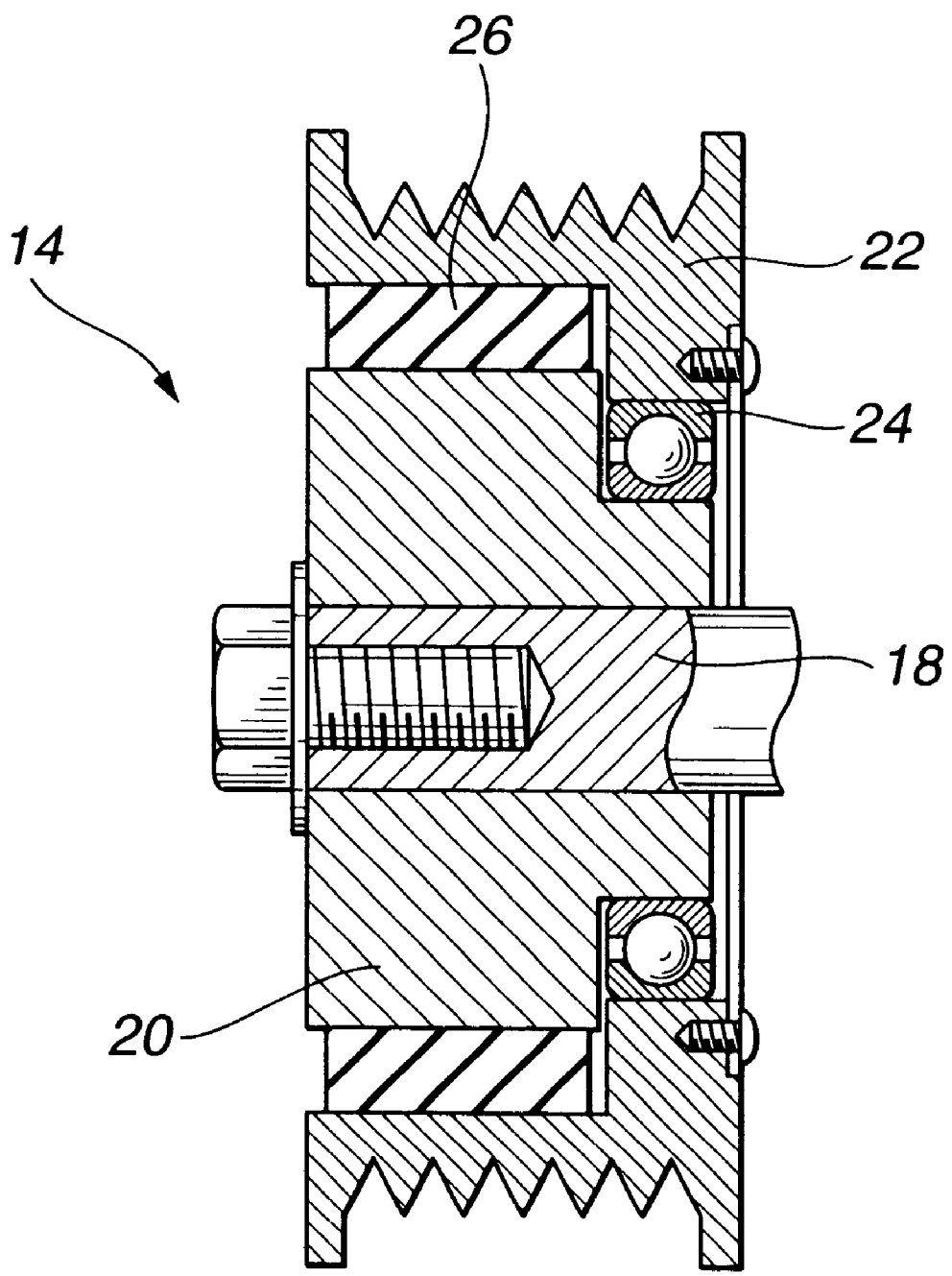
FIG. 5 is a cross-sectional view taken in the direction of arrows substantially along the line 5—5 of FIG. 4.

Alternator pulley 14 includes, as shown in FIGS. 4 and 5, inner peripheral portion 20 which is directly joined to alternator rotating shaft 18 serving as a part of a rotating member, and outer peripheral portion 22 around which the drive belt is trained or passed. Outer peripheral portion 22 is rotatably supported on inner peripheral portion 20 through bearing 24 and joined to inner peripheral portion 20 through rubber layer 26 serving as an elastic member.

When rotor portion 16 of alternator 12 is rotated through rubber layer 26, a vibration system composed of a spring/mass system with rubber layer 26 as a spring and rotor portion 16 as a mass is constituted, in which resonance is generated on a rotating system including the vibration system. At this time, antiresonance for rotational fluctuations of engine rotating shaft 4 occurs under this resonance. A frequency $f_1$ of the antiresonance is represented by the following equations (2) and (3):

$$f_0 = \frac{1}{2\pi}\sqrt{\frac{K(I_1 + \rho^2 I_2)}{I_1 I_2}} \qquad (2)$$

$$f_1 = \frac{1}{2\pi}\sqrt{\frac{K}{I_2}} \qquad (3)$$

where $f_0$ is a frequency of resonance; $f_1$ is a frequency of antiresonance for rotational fluctuations of engine rotating shaft; $I_1$ is an inertial mass of an engine rotating section composed of engine rotating shaft 4, flywheel 6 mounted on engine rotating shaft 4, and the like; $I_2$ is an inertial mass of rotor portion 16 of alternator 12; $\rho$ is a speed increasing ratio of alternator 12 ($\rho>0$ in the case of rotation of the alternator rotor portion in the same direction as that of engine rotating shaft 4, and $\rho<0$ in the case of rotation of the alternator rotor portion in the opposite direction to that of engine rotating shaft 4); and k is a rotational spring constant of rubber layer 26. It will be understood that the speed increasing ratio $\rho$ is a ratio between the radius of pulley 8 and the radius of pulley 14.

It will be appreciated that a large effect of reducing rotational fluctuations can be obtained by causing the frequency of antiresonance to be coincident with frequencies of vibrations which are frequently generated at generally constant engine speeds in engine operating conditions of engine 2 and generated or problematic in the engine operating conditions where rotational fluctuations of engine rotating shaft 4 is serious or critical.

Usually, in the case of an engine for automotive vehicles, idling operation is given as an example of such engine operating condition. Also, in the case of a four-cylinder engine, its vibration predominantly contains 2nd, 4th and 6th harmonic components of frequency in engine revolution owing to fluctuations in combustion pressure in the engine, in which particularly 2nd harmonic component of frequency in engine revolution is predominant. In case of a six-cylinder engine, 3rd harmonic component of frequency is particularly predominant. In case of an eight-cylinder engine, 4th harmonic component of frequency is particularly predominant. Generally, a harmonic component of ½ times the number of (engine) cylinders of the engine is called a "fundamental harmonic component".

For example, in the case where idling engine speed in a four-cylinder engine is 750 rpm, an inertial mass $I_2$ of rotor portion 16 of alternator 12, a rotating spring constant k of rubber layer 26, and speed increasing ratio $\rho$ are set in accordance with the above formulae (2) and (3) in such a manner that frequency of antiresonance coincides to 2nd harmonic component of idling engine speed, that is, 25 ((750/60)×2) Hz which is two times of rotational frequency (or engine speed, more specifically an engine speed (r.p.m.)/60) of engine rotating shaft 4.

Figure 6:
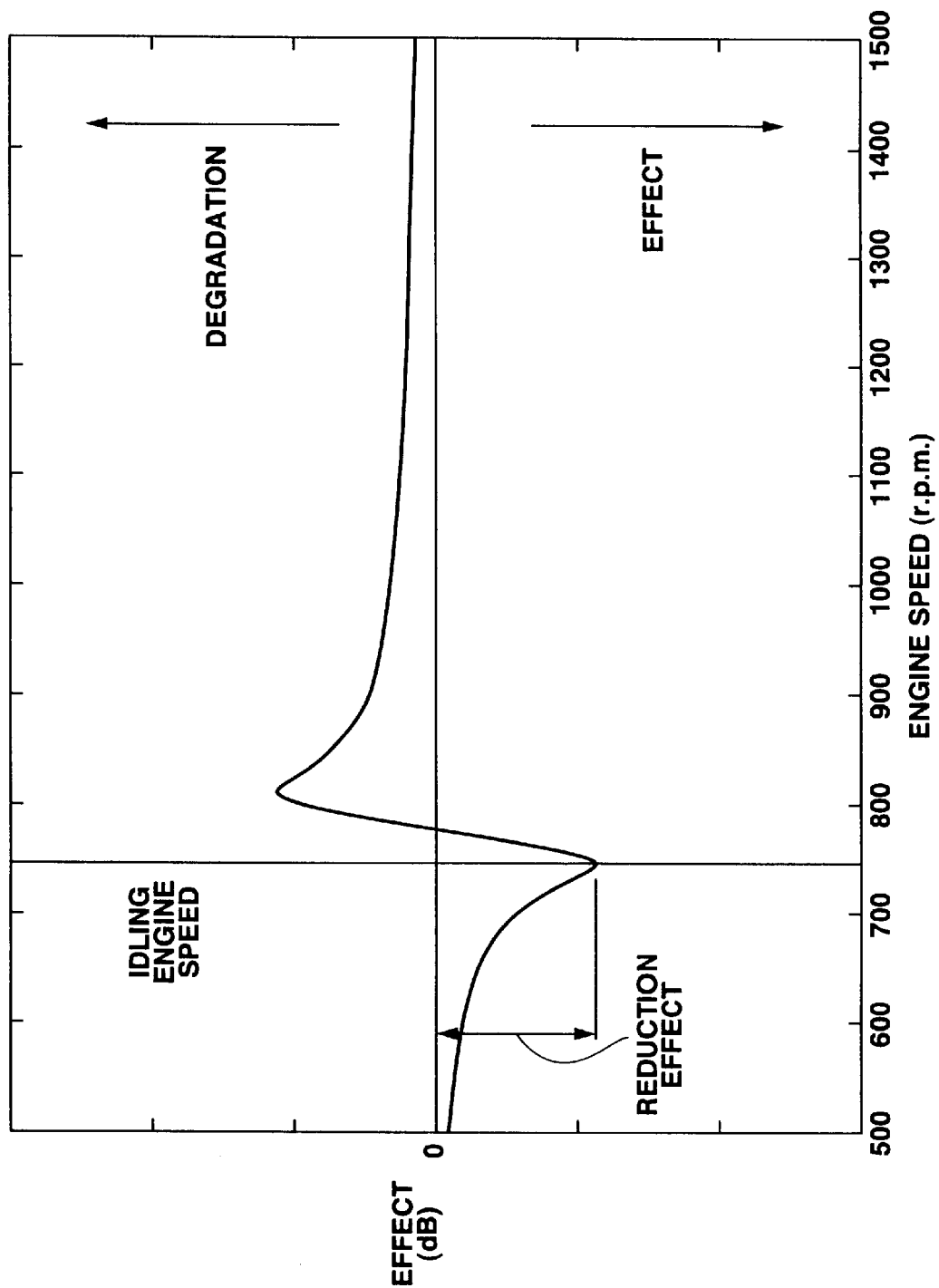
FIG. 6 is a graph showing effects of reduction for rotational fluctuations in the engine of FIG. 1 in connection with the first embodiment of the vibration reducing system.

This can provide a high effect of reduction in rotational fluctuations at an idling engine revolution or idling engine operating condition (at an engine speed of 750 rpm) of an internal combustion engine as shown in FIG. 6.

The spring constant k of rubber layer 26 in a direction of rotation is suitably set by changing a material and a thickness of rubber layer 26. Concretely, the rotating spring constant k is decreased when the material of rubber layer 26 is made soft and the thickness of rubber layer in a radial direction is made large. Additionally, the above-mentioned speed increasing ratio $\rho$ is determined by a ratio of a diameter of pulley 8 for driving of alternator 12 and a diameter of alternator pulley 14. In order to reduce the ratio, it is sufficient to decrease the outer diameter of pulley 8 and to increase the outer diameter of outer peripheral portion 22 of alternator pulley 14.

As shown in FIG. 6, it is found that rotational fluctuations are degraded around 28 Hz which is frequency $f_0$ of resonance at the time of idling engine revolution, that is, 800 rpm in engine speed of an internal combustion engine. However, such engine speed is actually hardly used so that no significant problem will arises because engine speeds over 1000 rpm are mainly used in driving of the engine under usual engine operating conditions.

Hereinafter, discussion will be made on a variety of embodiments of the vibration reducing system according to the present invention, in which the same reference numerals as those in the first embodiment designate the same components parts and elements for the purpose of simplicity of illustration, omitting the corresponding explanation.

Figure 7:
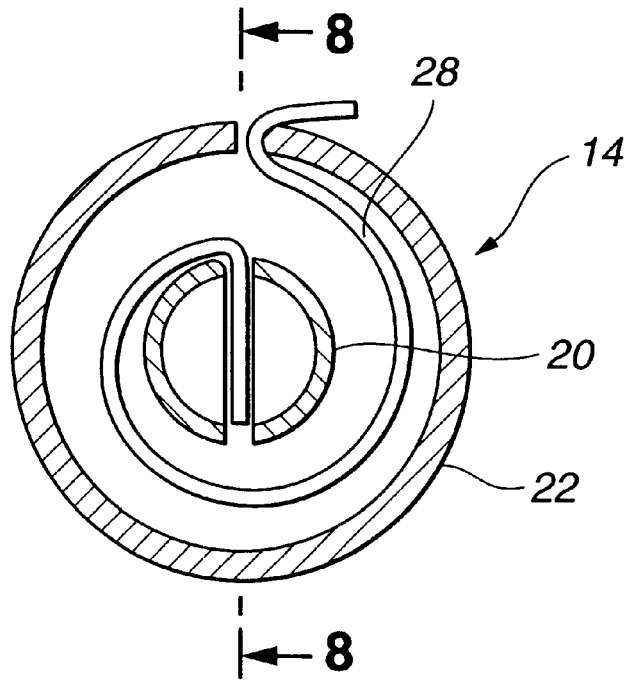
FIG. 7 is a cross-sectional view of an alternator pulley of an alternator used in an internal combustion engine provided with a second embodiment of the vibration reducing system according to the present invention.
Figure 8:
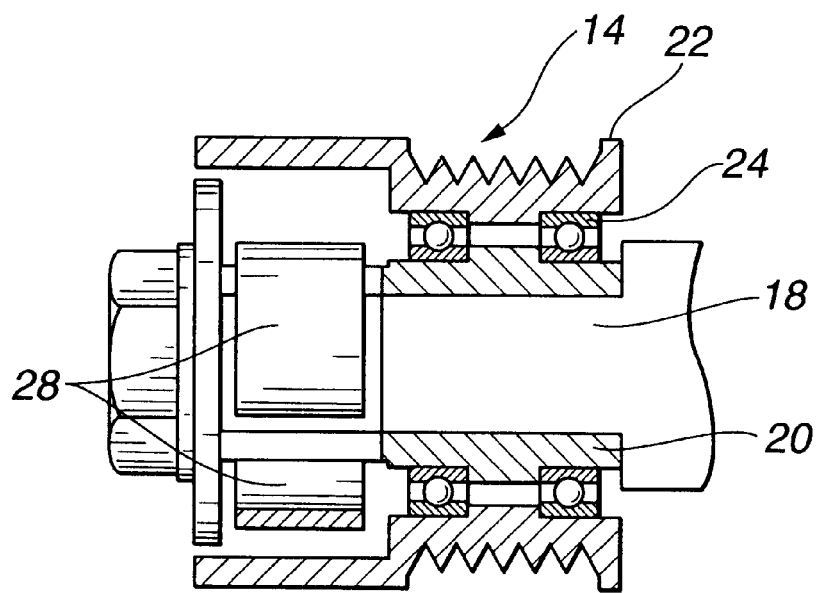
FIG. 8 is a cross-sectional view taken in the direction of arrows substantially along the line 8—8 of FIG. 7.

FIGS. 7 and 8 illustrate a second embodiment of the vibration reducing system of the present invention.

In the second embodiment, outer peripheral portion 22 of alternator pulley 14 is joined to inner peripheral portion 20 of alternator pulley 14 through metal spring 28 without using rubber layer 26. More specifically, inner peripheral portion 20 of alternator pulley 14 is fixed to alternator rotating shaft 18 in the same manner as in the above-mentioned first embodiment, and outer peripheral portion 22 of alternator pulley 14 is rotatably supported on inner peripheral portion 20 through bearing 24 while outer peripheral portion 22 and inner peripheral portion 20 are joined to each other by spiral metal spring 28. Metal spring 28 has its inner end inserted into alternator rotating shaft 18 and its outer end inserted into outer peripheral portion 22.

When alternator pulley 14 is provided with such a spring element, antiresonance occurs not only for rotational fluctuations of engine rotating shaft 4 but also for engine roll vibrations. Frequency $f_2$ of antiresonance for engine roll vibrations is represented by the following formula (4):

$$f_2 = \frac{1}{2\pi}\sqrt{\frac{K(I_1 + \rho I_2)}{I_1 I_2}} \qquad (4)$$

In the case where alternator 12 and engine rotating shaft 4 rotate in the same direction as in the above-mentioned first embodiment, frequency of antiresonance for engine roll vibrations is higher than frequency of antiresonance for rotational fluctuations of the engine rotating shaft.

Figure 9:
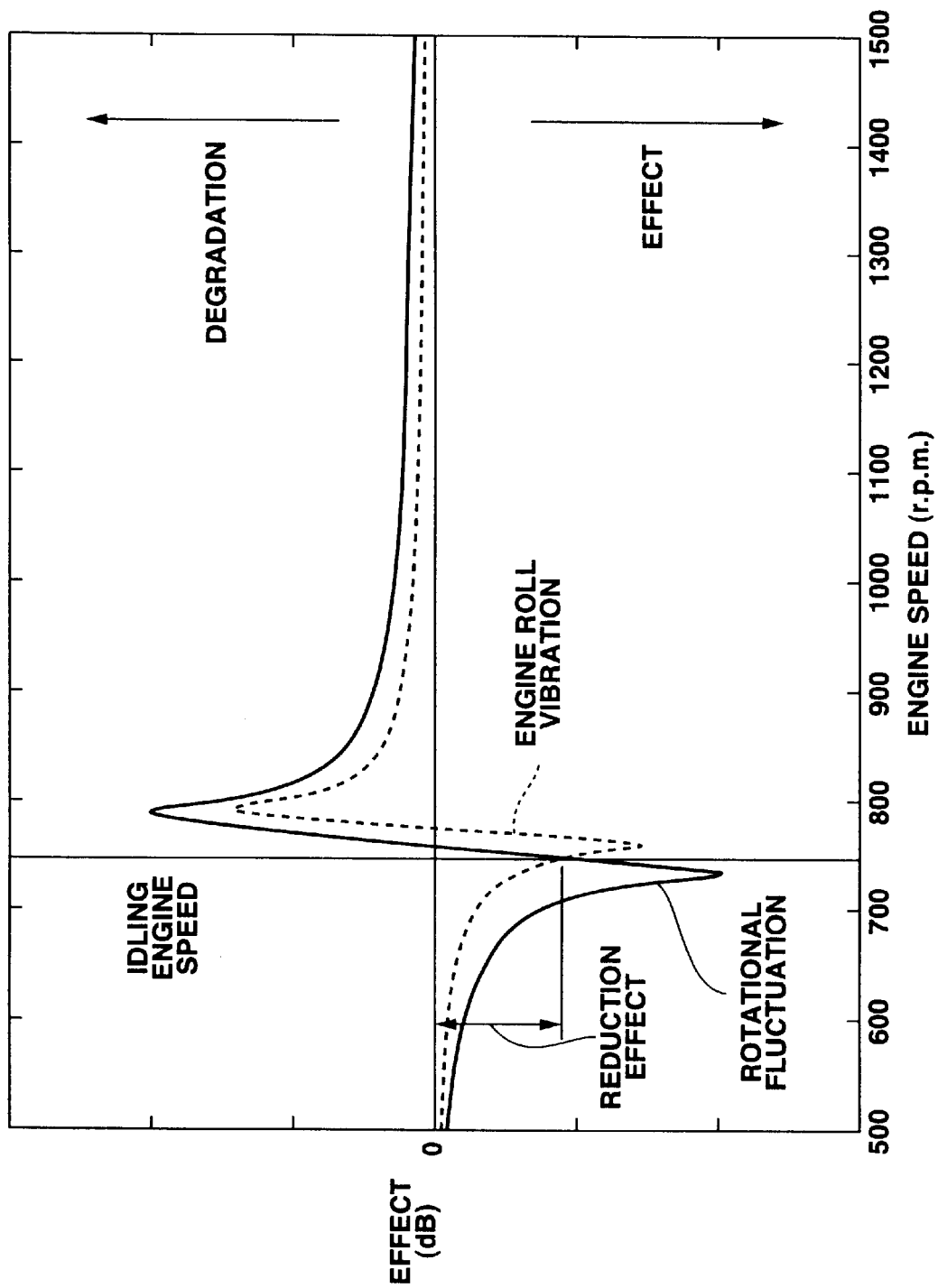
FIG. 9 is a graph showing effects of reduction for rotational fluctuations and engine roll vibration in the engine in connection with the second embodiment of the vibration reducing system.

FIG. 9 shows comparison in effects between rotational fluctuations and engine roll vibrations. FIG. 9 depicts that both effects in suppressing engine roll vibrations in antiresonance of rotational fluctuations and effects in suppressing rotational fluctuations in antiresonance of engine roll vibrations are small, and that when one of the frequency of the above two antiresonances is set to an idling engine speed, the effects of the other antiresonance is not so obtained. Here, in the second embodiment, spring constant of metal spring 28 of alternator pulley 14 and an inertial mass of and a speed increasing ratio of rotor portion 16 are adjusted in such a manner that frequency of the fundamental harmonic component (frequency of fundamental harmonic component of engine revolution) of idling engine revolution, that is, 25 Hz which is 2nd harmonic component in a four cylinder engine comes substantially intermediate between two frequencies of respective above two antiresonances. By this, it can be possible in the second embodiment to obtain a reducing effect for both engine roll vibrations and rotational fluctuations at idling engine revolution of engine 2, and the use of metal spring 28 enables decreasing damping as compared with an elastic member formed of a rubber layer, so that antiresonance becomes highly effective while an increased effect of reducing idling vibrations can be obtained.

Figure 10:
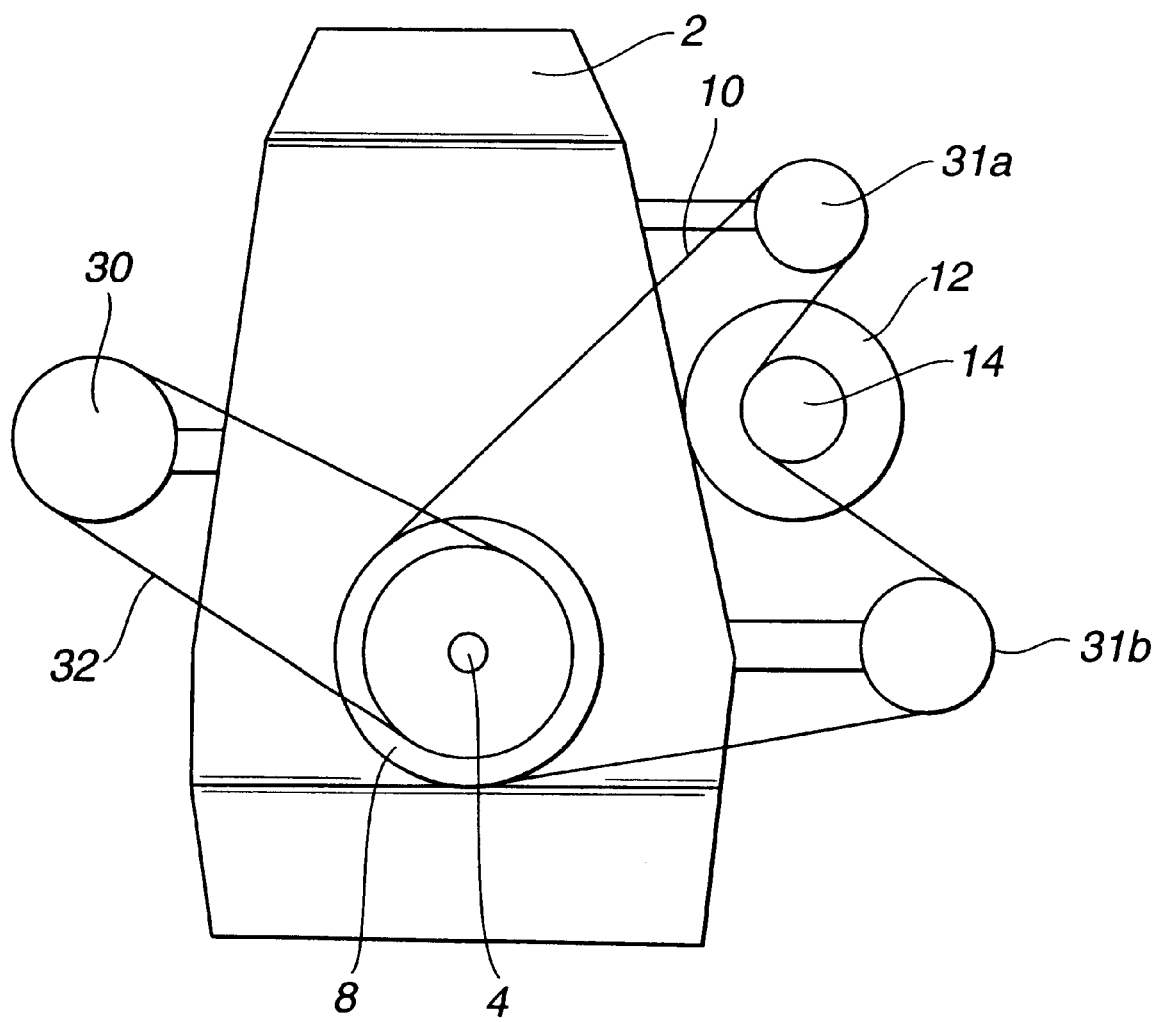
FIG. 10 is a schematic front view of an internal combustion engine provided with a third embodiment of the vibration reducing system according to the present invention.

FIG. 10 illustrates a third embodiment of the vibration reducing system of the present invention, similar to the second embodiment.

In the third embodiment, alternator pulley 14 is driven by drive belt at a back-side surface in the above-mentioned second embodiment, in which alternator pulley 14 is rotated in an opposite direction relative to engine rotating shaft 4.

Figure 11:
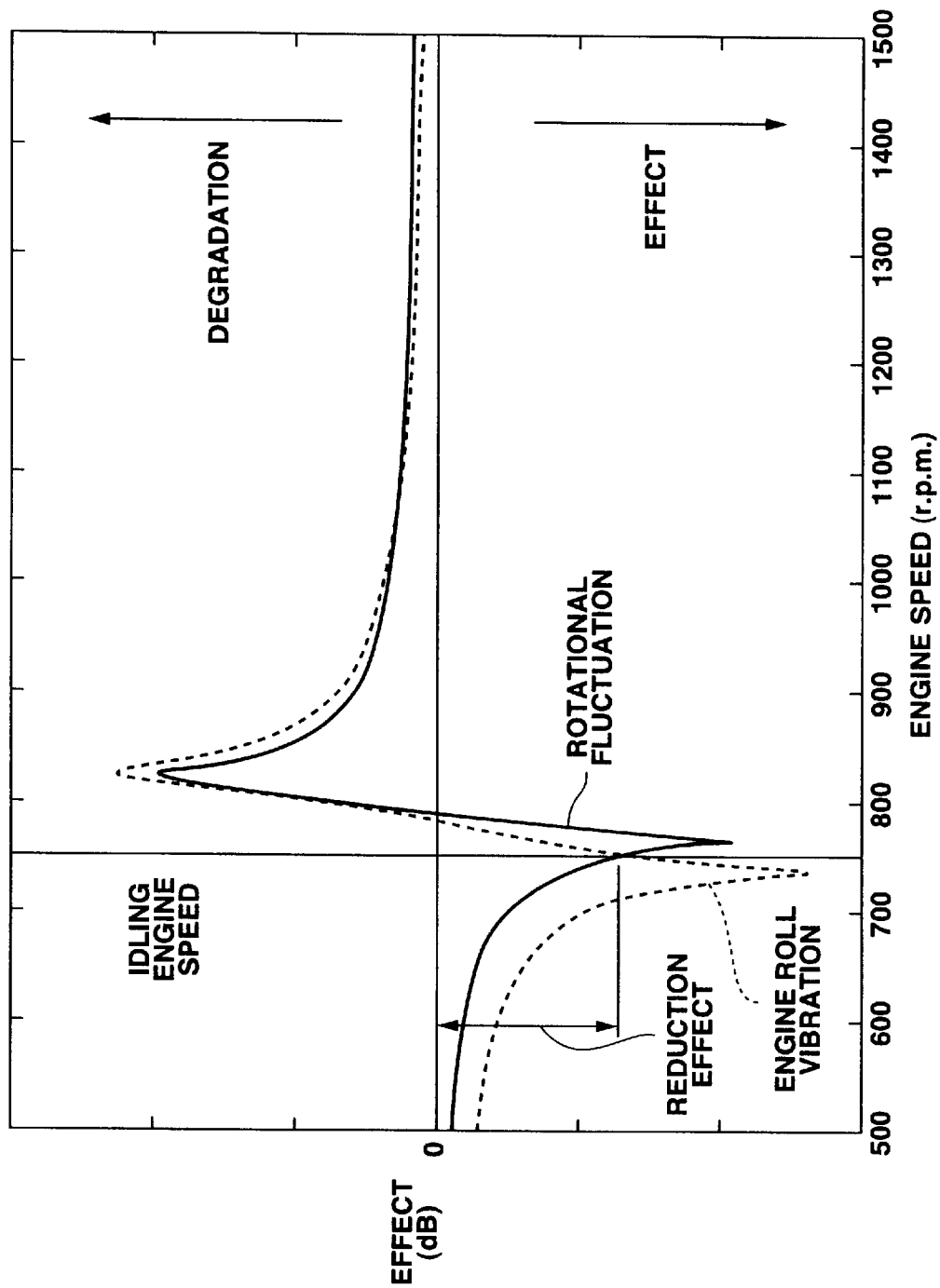
FIG. 11 is a graph showing effects of reduction for rotational fluctuations and engine roll vibration in the engine in connection with the third embodiment of the vibration reducing system.

Thus antiresonance becomes much effective as shown in FIG. 11, and therefore a further large effect of reducing idling vibrations can be obtained relative to the second embodiment.

When alternator 12 and engine rotating shaft 4 are opposite to each other in a direction of rotation as in the third embodiment, frequency of antiresonance for rotational fluctuations appears in a higher range than frequency of antiresonance for engine roll vibrations. Additionally, the reference numeral 30 designates an accessory other than alternator 12, the accessory being driven by an accessory drive belt different from drive belt 10 for driving of alternator 12. In addition, the reference numerals 31a, 31b designate accessories driven by the drive belt.

Figure 12:
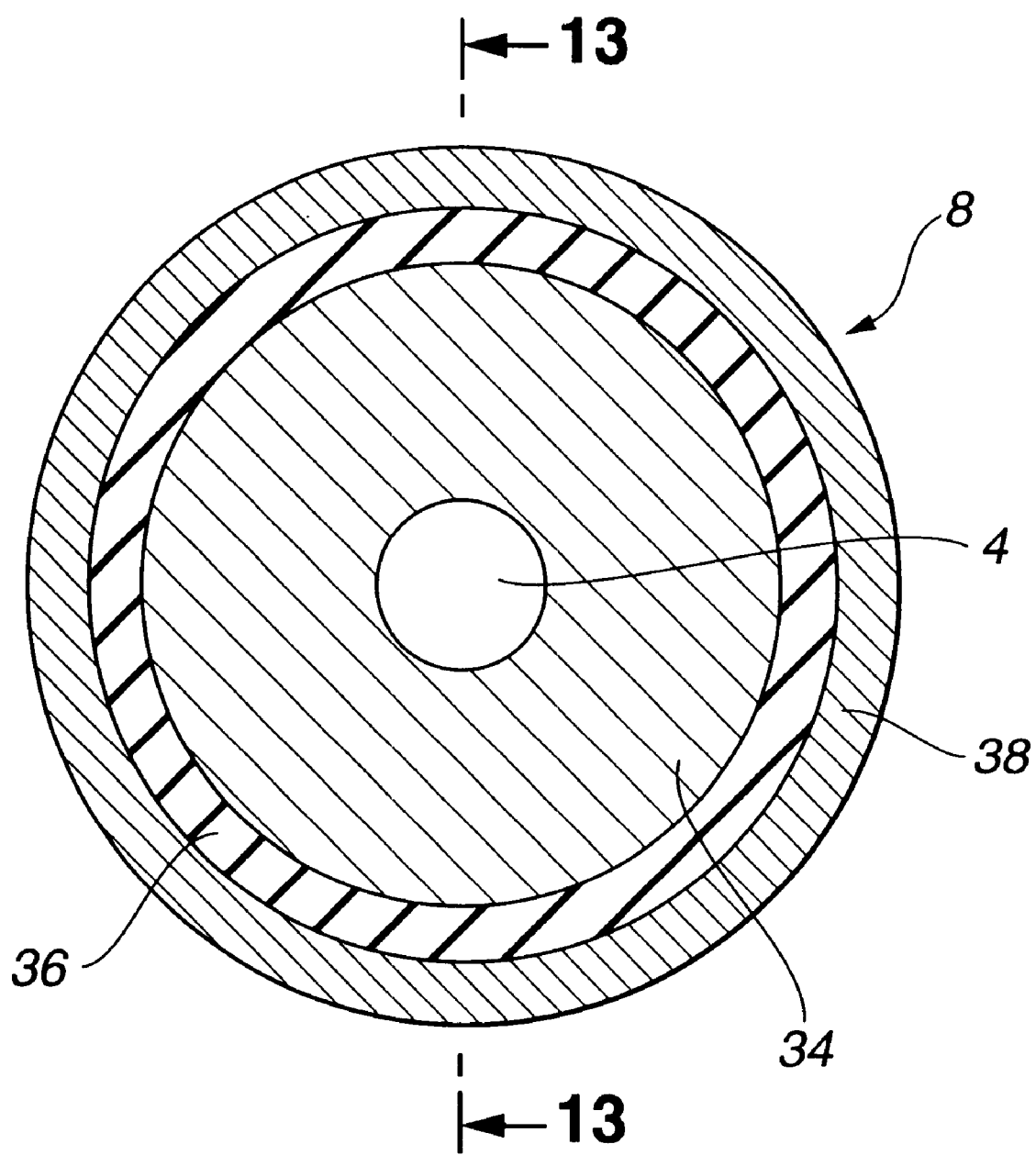
FIG. 12 is a cross-sectional view of a crank pulley used in an internal combustion engine provided with a fourth embodiment of the vibration reducing system according to the present invention.
Figure 13:
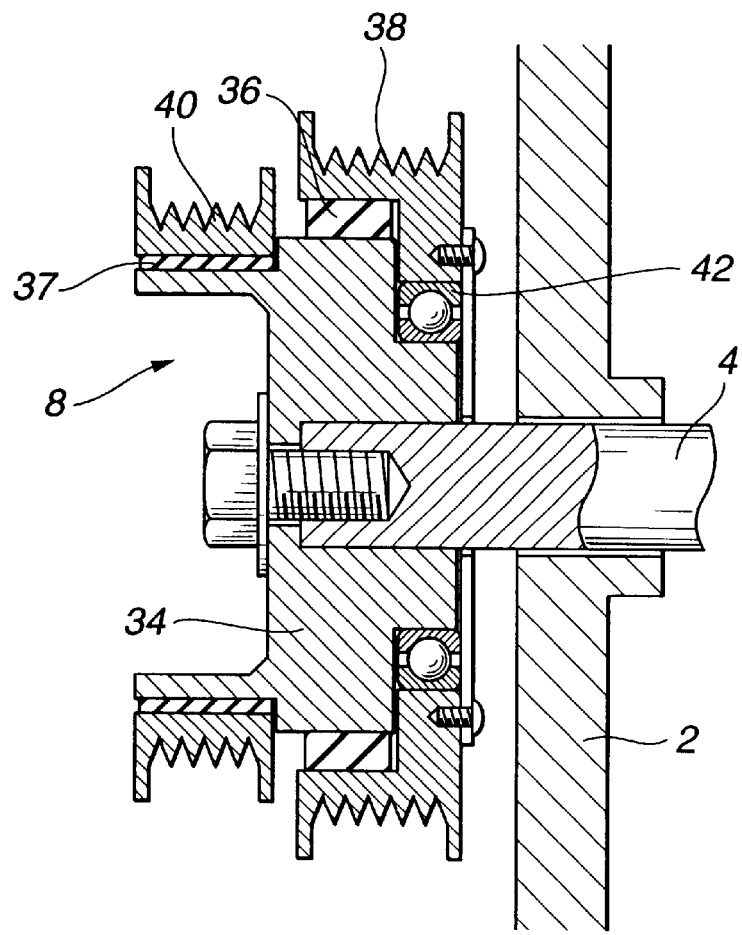
FIG. 13 is a cross-sectional view taken in the direction of arrows substantially along the line 13—13 of FIG. 12.

FIGS. 12 and 13 illustrate a fourth embodiment of the vibration reducing system of the present invention, similar to the third embodiment shown in FIG. 10. The fourth embodiment shown in FIG. 10 is constituted substantially in the same manner as the third embodiment shown in FIG. 10 with the exception that rubber layer 36 serving as an elastic member is provided on pulley 8 mounted to engine rotating shaft 4, as shown in FIGS. 12 and 13.

Pulley 8 is composed of inner peripheral portion 34 joined to engine rotating shaft 4. First outer peripheral portion 38 and second outer peripheral portion 40 are joined to inner peripheral portion 34. More specifically, first outer peripheral portion 38, around which drive belt 10 for driving of alternator 12 is trained or passed, is rotatably supported on inner peripheral portion 34 through bearing 42 and joined to inner peripheral portion 34 through rubber layer 36.

Second outer peripheral portion 40, around which accessory driving belt 32 for driving of accessory 30 is trained or passed, is joined to inner peripheral portion 34 through rubber layer 37. The spring constant of rubber layer 37 and inertial moment of second outer peripheral portion 40 are tuned so that second outer peripheral portion 40 serves as a dynamic damper for suppressing torsional resonance of engine rotating shaft 4.

In this way, since the spring element is provided between engine rotating shaft 4 and alternator 12, antiresonance becomes greatly effective in the same manner as in the above-mentioned embodiment, and therefore the effects of idling vibration reduction can be obtained. Additionally, since alternator 12 is driven in a direction opposite to that of rotation of engine rotating shaft 4, a great effect of antiresonance can be obtained.

Accessories 30, 31a, 31b other than alternator 12 are also driven through spring elements, so that accessory 30 other than alternator 12 is included in a mass of a spring/mass system to make it possible to enlarge the mass.

Figure 14:
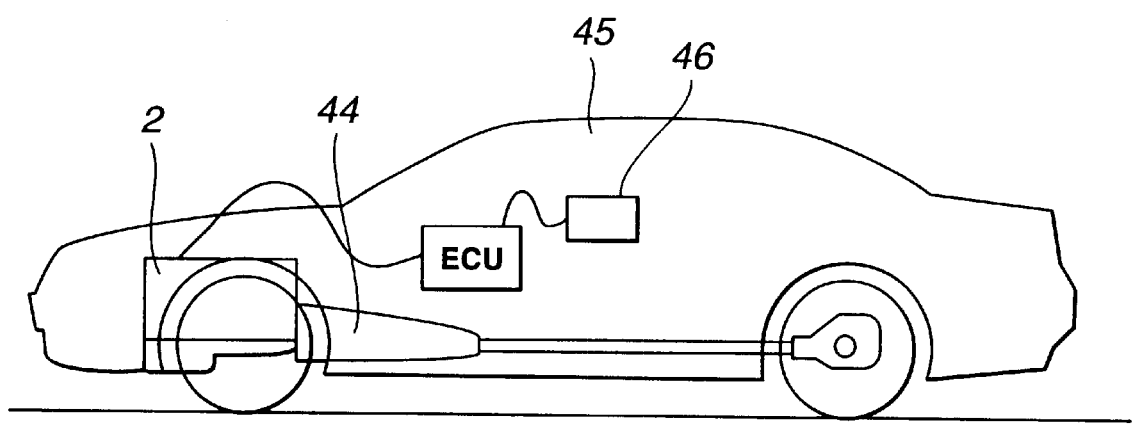
FIG. 14 is a schematic illustration of an automotive vehicle on which the engine provided with the fourth embodiment of the vibration reducing system is mounted.

Further, engine 2 provided with the vibration reducing system of the fourth embodiment is mounted on an automotive vehicle 45, upon being combined with manual transmission 44, as shown in FIG. 14. Idling engine speed of the engine is controlled by ECU (engine or electronic control unit). This vehicle is equipped with an air conditioner whose actuation and stoppage are repeated for temperature control, in response to a signal from air conditioner control unit 46.

In manual transmission 44, rotational fluctuations input from engine 2 cause gears in manual transmission 44 to generate clattering sounds in some cases at idling operation under an engine operating condition in which engine load becomes large at the time of actuation of the air conditioner.

In order to prevent the above, when an air conditioner is actuated in response to the signal from air conditioner control unit 46 so that engine load increases in vehicle 44 with the vibration reducing system of the embodiment, the signal from air conditioner control unit 46 is also input into ECU. In order to maximize an effect of reduction of rotational fluctuations of engine rotating shaft 4, ECU having detected the input signal modifies or changes idling engine speed so that frequency of the rotational fundamental harmonic component corresponds to frequency at which rotational fluctuations of engine rotating shaft 4 lead to antiresonance.

Since clattering sounds in manual transmission 44 do not lead to problem in other engine operating conditions, idling engine speed is modified so as to cause the frequency of the rotational fundamental harmonic component to be coincident with the frequency of antiresonance of engine roll vibration input into a vehicle body through an engine mount, which vibration largely contributes to idling vibrations and booming noise in a passenger compartment, in order to minimize such idling vibrations and booming noise.

Figure 15:
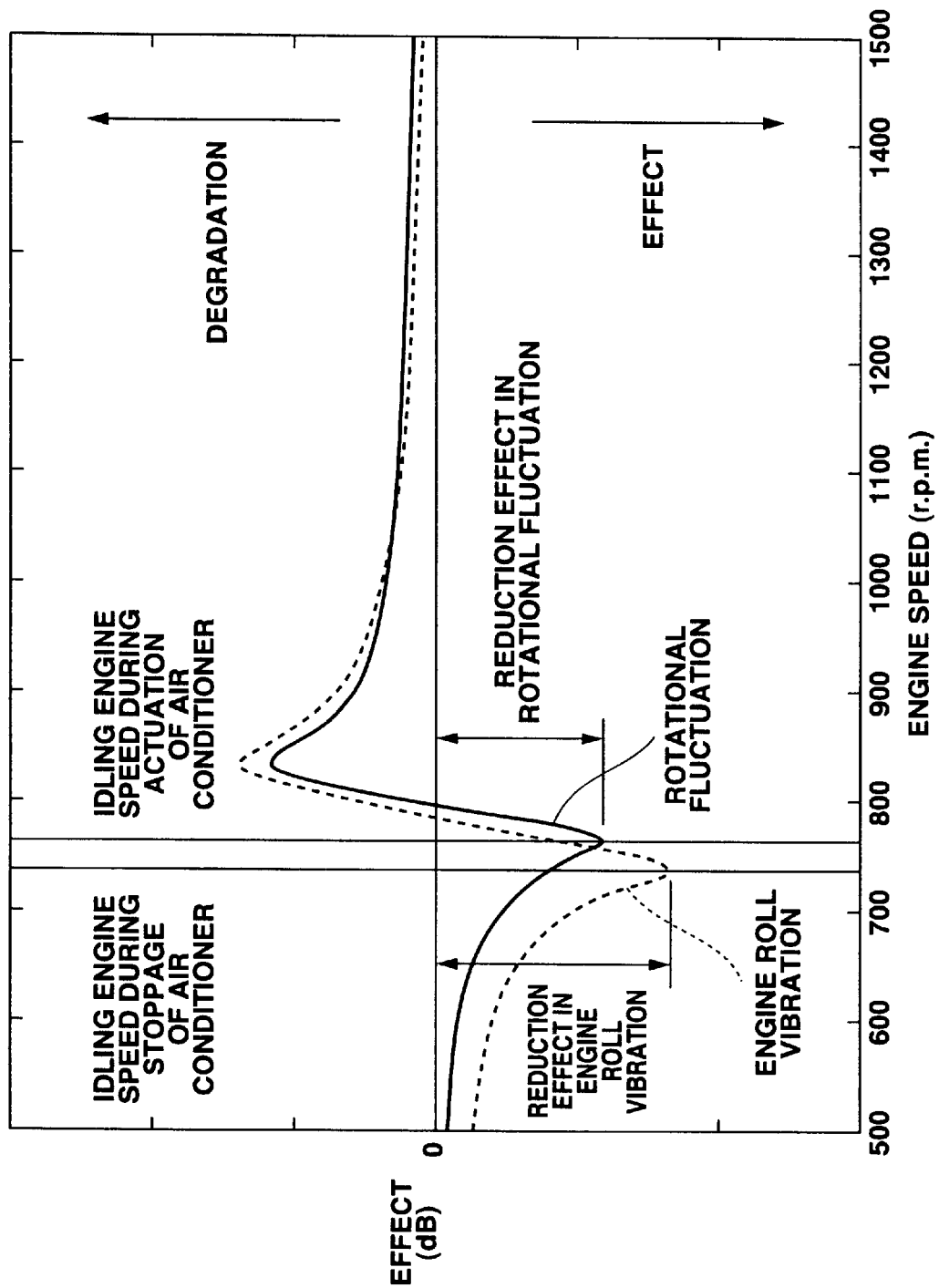
FIG. 15 is a graph showing effects of reduction for rotational fluctuations and engine roll vibration in the engine in connection with the fourth embodiment of the vibration reducing system.

Therefore, as shown in FIG. 15, it can be accomplished to reduce rotational fluctuations at the actuation of the air conditioner and engine roll vibration at the time of stoppage of an air conditioner, and to reduce idling vibrations and booming noise while preventing clattering sounds in the manual transmission.

Figure 16:
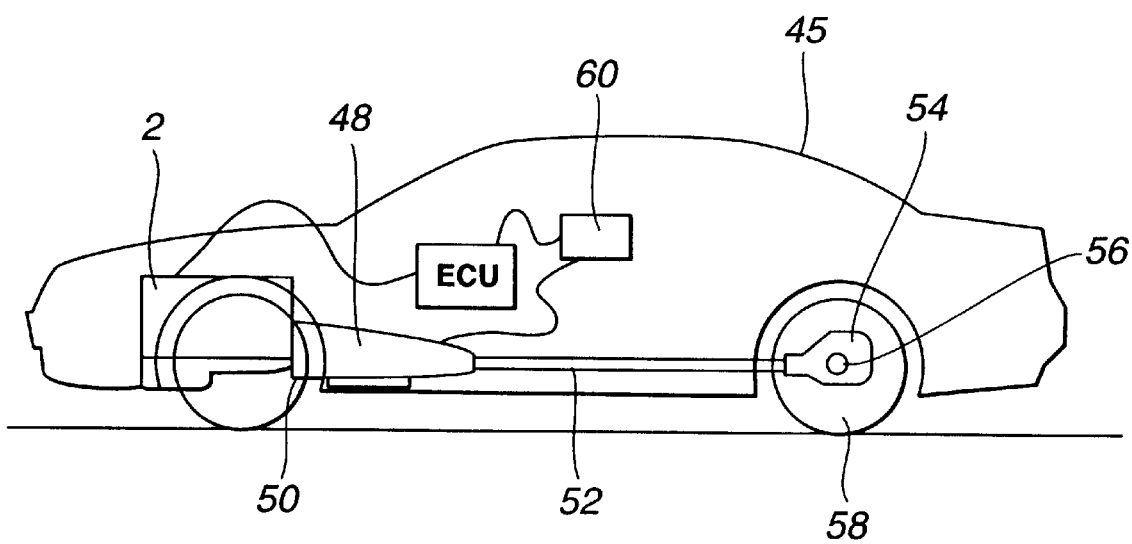
FIG. 16 is a schematic illustration of an automotive vehicle on which an internal combustion engine provided with a fifth embodiment of the vibration reducing system according to the present invention.

FIG. 16 illustrates a fifth embodiment of the vibration reducing system of the present invention, similar to the fourth embodiment.

In this case, engine 2 having the same arrangement as that in the fourth embodiment is mounted on the vehicle upon being combined with automatic transmission 48.

With automatic transmission 48, in the case where engine 2 is in an idling operation while automatic transmission 48 is in range (position) of neutral or parking, engine 2 makes its revolution upon being disengaged from automatic transmission 48, so that rotational fluctuations of engine rotating shaft 4 do not contribute to vibrations of a vehicle and booming noise to which engine roll vibration input through an engine mount contributes largely.

Additionally, in the case where automatic transmission 48 is in the range of driving in idling condition, revolutions of engine 2 are transmitted to automatic transmission 48 through torque converter 50, and therefore rotational fluctuations are transmitted to tires or road wheels 58 via propeller shaft 52, differential gear 54 and drive shaft 56 (for road wheels) from automatic transmission 48, so that reaction forces at these parts are input into vehicle 45 to generate vibrations and booming noise and contribute vibrations and booming noise more than an input from an engine mount does.

In the case where automatic transmission 48 is in the range of driving, a signal from automatic transmission control unit 60 is input into ECU, and in order to maximize an effect of reduction of rotational fluctuations of engine rotating shaft 4, ECU having detected the input signal modifies or changes idling engine speed so that the frequency of the rotational fundamental harmonic component is made coincident with the frequency at which rotational fluctuations lead to antiresonance.

In the case where automatic transmission 48 is out of the range of driving, a signal from automatic transmission control unit 60 is similarly input into ECU, and in order to maximize an effect of reduction of engine roll vibration, ECU having detected the input signal modifies or changes idling engine speed so that frequency of the rotational fundamental harmonic component is made coincident with the frequency at which engine roll vibration leads to antiresonance.

Figure 17:
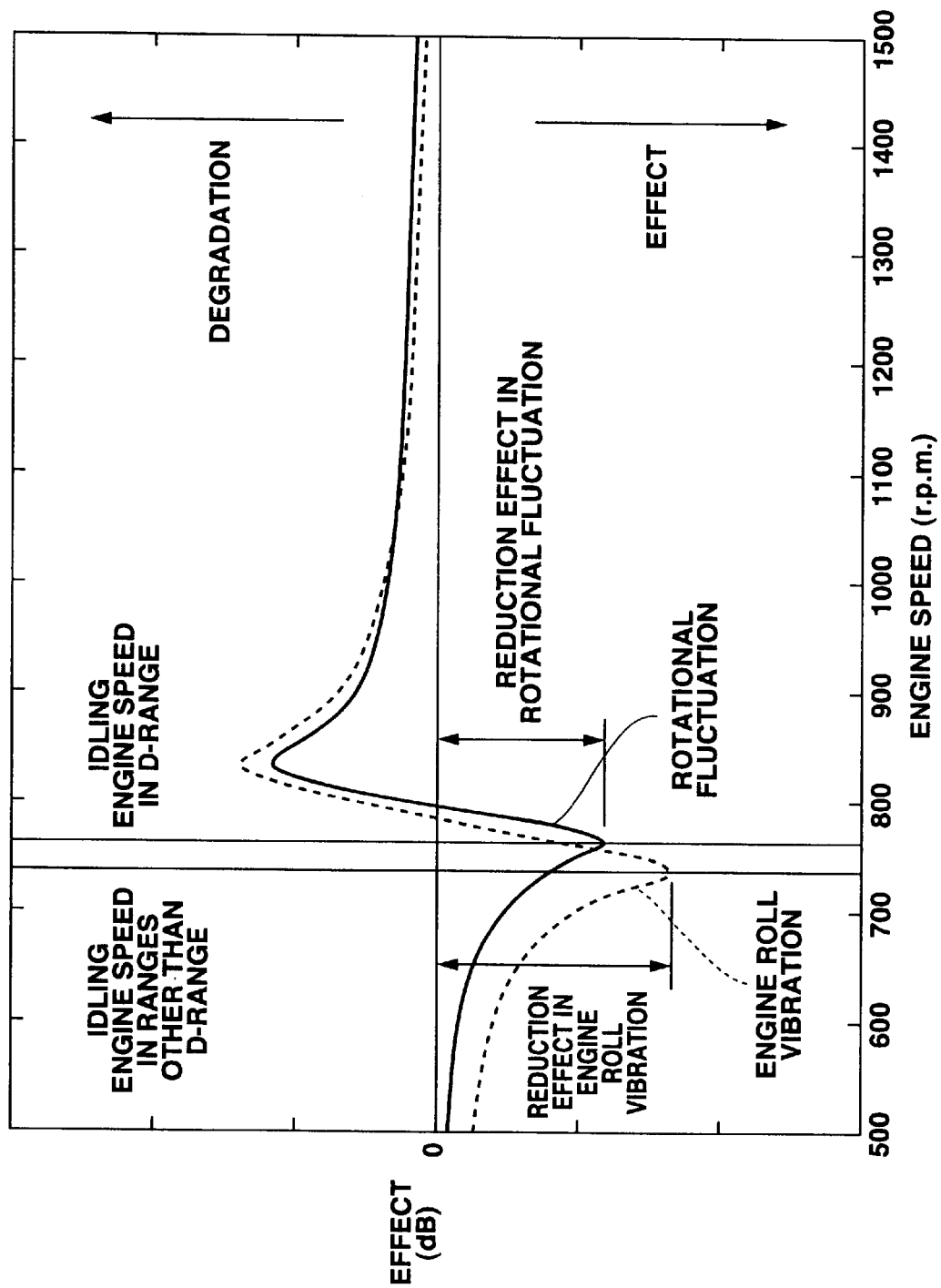
FIG. 17 is a graph showing effects of reduction for rotational fluctuations and engine roll vibration in the engine provided with the fifth embodiment of the vibration reducing system.

In this way, it can be accomplished, in this vehicle 45, to obtain an large effect of reducing vibrations and booming noise throughout all idling operations as shown in FIG. 17.

Figure 18A:
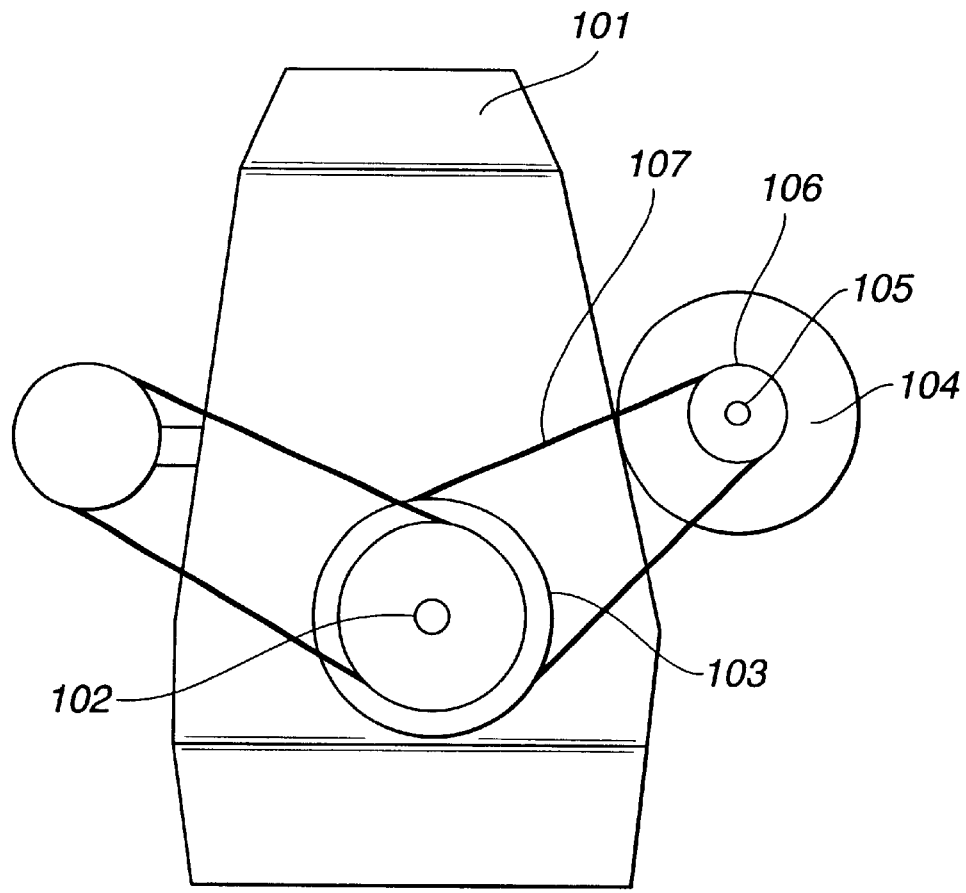
FIG. 18A is a schematic front view of an internal combustion engine provided with a sixth embodiment of the vibration reducing system according to the present invention.
Figure 18B:
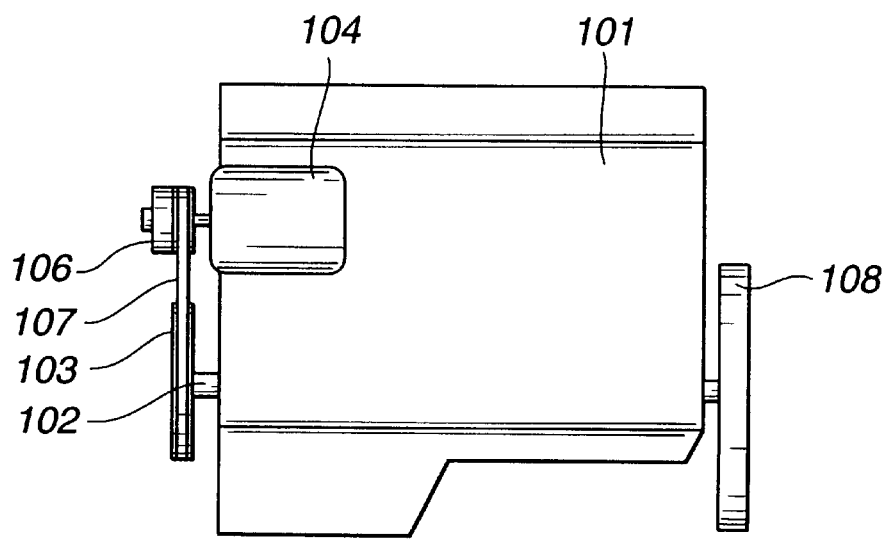
FIG. 18B is a schematic side view of the engine of FIG. 18A.
Figure 19:
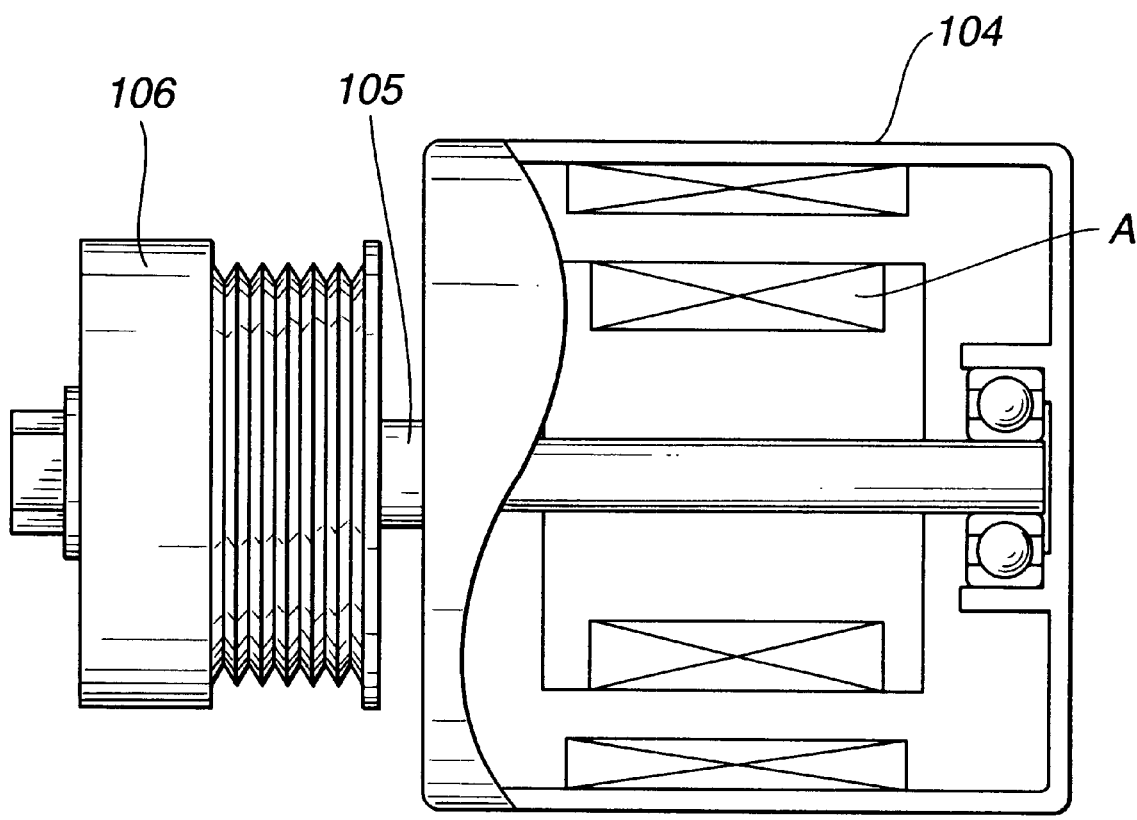
FIG. 19 is a schematic side view, partly in section, of an alternator used in the engine of FIGS. 18A and 18B.

FIGS. 18A to 21 illustrate a sixth embodiment of the vibration reducing system of the present invention, which is incorporated with a four-cylinder engine (internal combustion engine)101 for automotive vehicles as shown in FIGS. 18A and 18B. In engine 101, crank pulley 103 is fixed to a front end portion of crankshaft (engine rotating shaft) 102, which generates driving force for the vehicle. Alternator 104 as an accessory is provided to be driven to rotate in the same direction as that of crankshaft 102, as shown in FIG. 19, by means of accessory drive belt 107 trained or passed around alternator pulley 106 fixed to rotating shaft 105 and crank pulley 103. Alternator pulley 106, crank pulley 103, accessory drive belt 107 and like constitute a drive force transmitting mechanism for transmitting rotating torque of crankshaft 102. In addition, flywheel 108 is fixed to a rear end portion of crankshaft 102.

Alternator pulley 106 includes, as shown in FIGS. 20A and 20B, two parts, that is, inner peripheral portion 106A which is directly joined to rotating shaft 105 through bearing, and outer peripheral portion 106B around which accessory drive belt 107 is trained or passed. The outer peripheral portion 106B is rotatably supported on rotating shaft 105. The inner and outer peripheral portions 106A, 106B are rotatably coupled with each other through coil spring 106C which is an elastic member. Here, coil spring 106C has such a non-linear characteristics for spring force that a wire material for the spring has, as shown upon being enlarged in FIG. 21, two portions which respectively have small and large coil spaces. As a result, the hardness of the spring increases (the spring constant becomes large) in the course of a relative rotating-angular displacement (simply, referred below to as angular displacement) between inner peripheral portion 106A and outer peripheral portion 106B which constitute rotating members of the drive force transmitting mechanism, thus providing the non-linear characteristics of the springs 106C.

A rotational vibration system is constituted by the thus arranged coil springs 106C and a mass composed of flywheel 108 fixed to the rear end portion of crankshaft 102, and rotor portion (A in FIG. 19) of alternator pulley 106. Under the action of the rotational vibration system, antiresonance is generated for vibrations such as roll vibration of engine 101 and rotational fluctuations of crankshaft 102. The frequency of such antiresonance is represented by the following formulae (5), (6) and (7) in the linear region of the spring:

$$f_0 = \frac{1}{2\pi}\sqrt{\frac{K(I_1 + \rho^2 I_2)}{I_1 I_2}} \quad (5)$$

$$f_1 = \frac{1}{2\pi}\sqrt{\frac{K(I_1 + \rho I_2)}{I_1 I_2}} \quad (6)$$

$$f_1 = \frac{1}{2\pi}\sqrt{\frac{K}{I_2}} \quad (7)$$

where $f_0$ is a frequency of resonance; $f_1$ is a frequency of antiresonance in engine roll vibration; $f_2$ is a frequency of antiresonance in rotational fluctuations of engine rotating shaft; $I_1$ is an inertial moment of engine rotating sections such as flywheel and the like; $I_2$ is an inertial moment of rotating sections of an alternator; $\rho$ is the speed increasing ratio of an alternator, in which $\rho>0$ in the case of rotation of rotating section of alternator in the same direction as that of engine rotating shaft 102, and $\rho<0$ in the case of rotation of the alternator rotating section in the opposite direction to that of engine rotating shaft 4; and K is a spring constant of the coil spring.

It will be appreciated that a great effect in prevention of roll vibration can be obtained by causing such frequency of antiresonance to be coincident with the frequency which is frequently used in a generally constant engine speed condition and problematic in roll vibration of the engine, among a variety of engine operating conditions of engine 101. An example of such frequency is a frequency problematic in idling operation. Alternatively, a great effect in prevention of rotational fluctuations is obtained by causing such frequency of antiresonance to be coincident with the frequency in an engine operating condition where rotational fluctuations of the crankshaft is problematic. An example of such an engine operating condition is an idling operation in which load of the accessories is high.

Additionally, vibrations in the case of a four-cylinder engine predominantly contain 2nd, 4th, 6th, - - - harmonic components in engine revolution which components are generated owing to fluctuations in combustion pressure in (engine) cylinders, in which 2nd harmonic component in engine revolutions particularly predominant among the harmonic components. A 3rd harmonic component is predominant in the case of a six-cylinder engine, and a 4th harmonic component is predominant in the case of a eight-cylinder engine. In this way, in general, a harmonic component of ½ times the number of (engine) cylinders of the engine is called the "fundamental harmonic component". Accordingly, in case that idling engine speed in the four-cylinder engine is 750 rpm, the spring constant of coil spring 106C of alternator pulley 106, the magnitude of an inertial moment $I_2$ of the alternator rotating section and a speed increasing ratio $\rho$ are adjusted in accordance with the above formulae (6) and (7) in such a manner that frequency of antiresonance is coincident with 2nd harmonic component of the engine revolution, that is, 25 Hz.

In general, roll vibration of an engine in idling operation becomes problematic, for example, in a low engine load operating condition where an automatic transmission (A/T) is in the range of N (neutral) in an automatic transmission vehicle and load for driving accessories and the like is low in a manual transmission (M/T) vehicle. Additionally, rotational fluctuations of an engine in idling operation becomes problematic, for example, in a high engine load operating condition where an automatic transmission (A/T) is in the range of D (drive) in an automatic transmission vehicle and load for driving accessories and the like is high in a manual transmission (M/T) vehicle.

In the sixth embodiment, frequency of antiresonance is set in accordance with the above formula (7) so as to obtain an effect of reducing rotational fluctuations of the engine rotating shaft.

Figure 22:
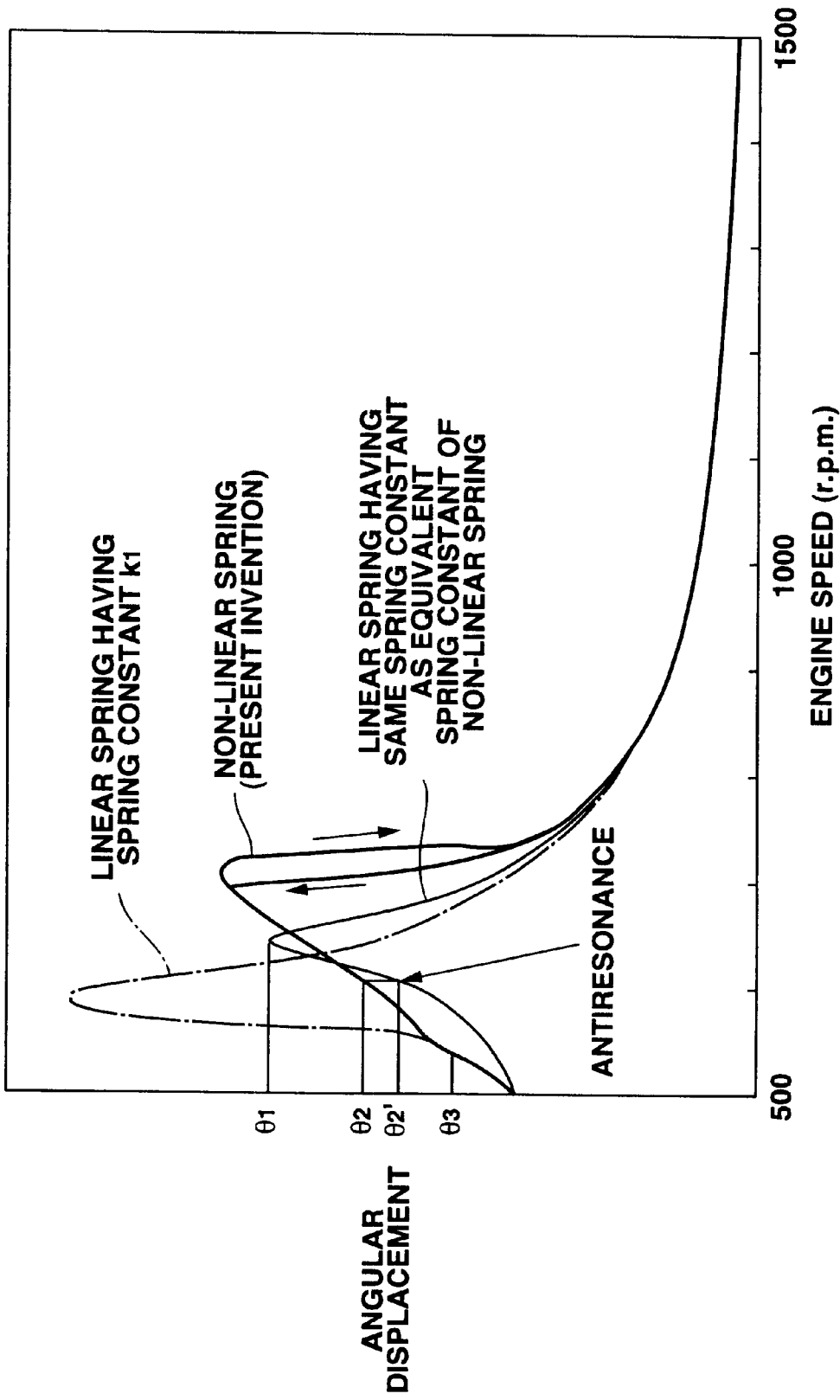
FIG. 22 is a graph showing the relationship between the engine speed and the rotational angular displacement in connection with the sixth embodiment of the vibration reducing system.

Here, in the case where inner peripheral portion 106A and outer peripheral portion 106B are relatively rotatably connected to each other through a spring (elastic member), which has a fully linear spring characteristics and the same spring constant as an equivalent spring constant of coil spring 106C at the time of antiresonance, an angular displacement θ will take a maximum angular displacement θ1 near the resonance point of this vibration system, as shown in FIG. 22. An angular displacement at the time of antiresonance will be smaller than this and takes a value θ2'.

Figure 23:
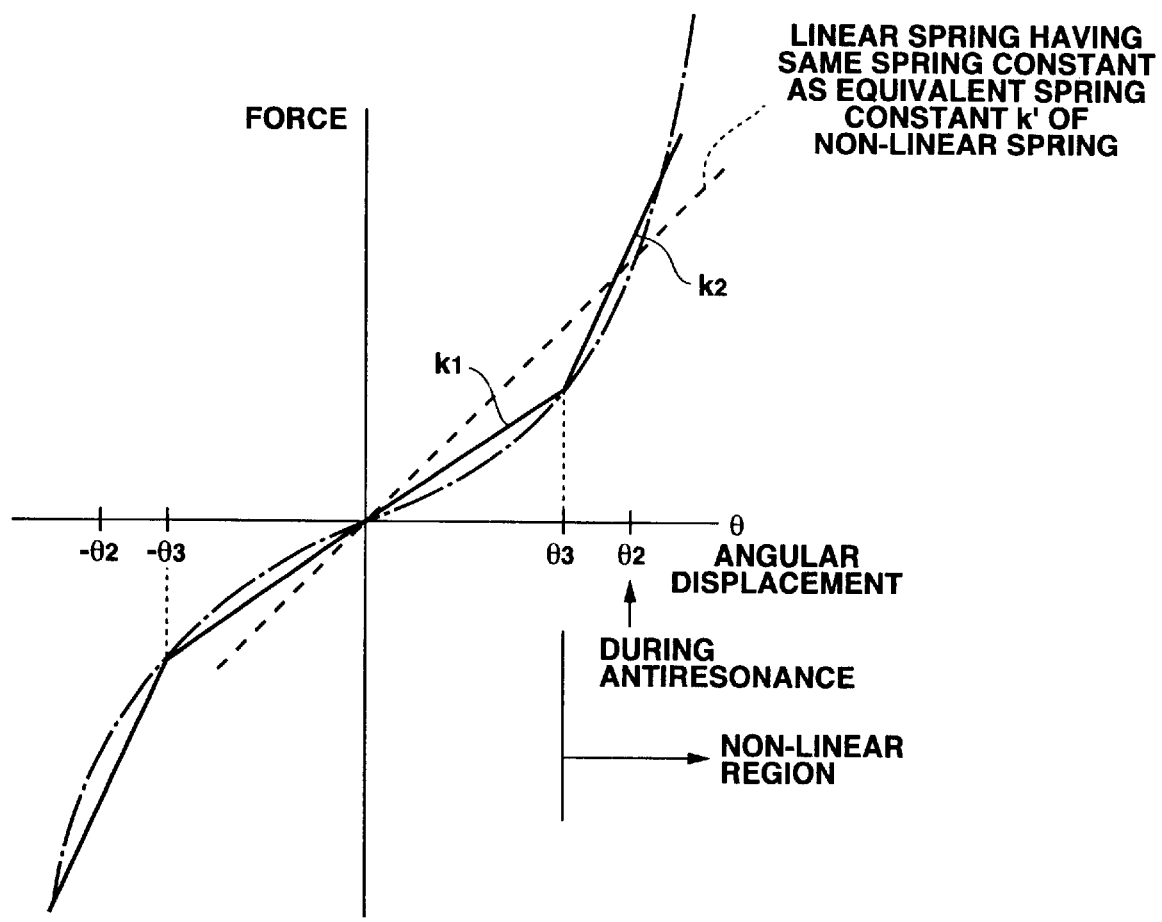
FIG. 23 is a graph showing the relationship between the rotational angular displacement and the spring force in connection with the sixth embodiment of the vibration reducing system.

In contrast, coil spring (as an elastic member) 106C having the non-linear spring characteristics has such a characteristics that there is a region where the spring constant k1 is linear from an angular displacement θ=0 to a angular displacement θ3 smaller than the angular displacement θ2' as shown in FIG. 23, so that the hardness of the spring becomes high (the spring constant is increased to k2) in respective regions of larger angular displacement than θ3. By this, the spring constant in the linear region becomes smaller than the spring constant at the time of antiresonance, so that the spring constant in the linear region can be made small as compared with the spring which has the fully linear spring characteristics. As a result, an effect of reducing rotational fluctuations at the time of antiresonance can be further increased as shown in FIG. 24, and a region where antiresonance is effective can be further enlarged owing to the effect that the spring becomes hard as an angular displacement increases.

An explanation will be given in details to the above-mentioned function.

Antiresonance is caused by the fact that two vibrating modes cancel each other. More specifically, in the embodiment, antiresonance is caused by the fact that cancellation is made between a mode in which mainly flywheel 108 makes its rotational vibration (i.e., rotational fluctuations of the crankshaft or engine rotating shaft 102 at a driving side) and another mode in which alternator 104 at a driven side to which driving force is transmitted through coil spring 106C makes its rotational vibration. Such antiresonance becomes the largest when the two vibrating modes have substantially the same vibration level. Consequently, in case of usual automotive vehicle engines, antiresonance can be made large by increasing the vibration level of the latter mode, in which the alternator experiences rotational vibrations, because the former mode in which the flywheel mainly makes its rotational vibrations is larger than the latter mode. In this regard, antiresonance is made large for enhancement of the vibration reducing effect by decreasing the spring constant in the linear region like coil spring 106C in the embodiment to increase amplitude (θ2>θ2', see FIG. 22) thereby to increase the vibration level.

Figure 24:
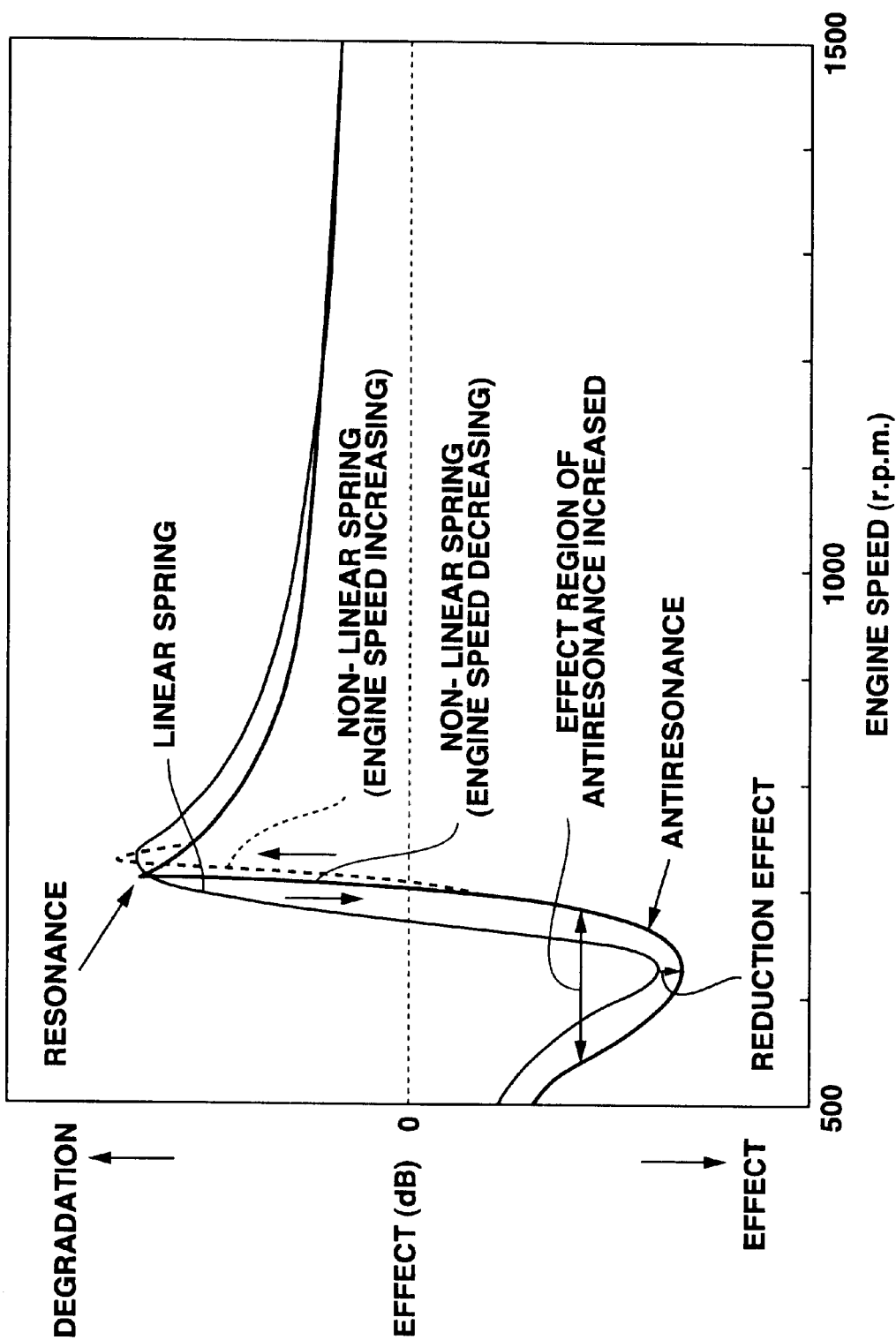
FIG. 24 is a graph showing the relationship between the engine speed and the effects in connection with the sixth embodiment of the vibration reducing system.

Additionally, when considering a situation in which the engine rotating speed increases toward the resonance point from the antiresonance point with reference to FIG. 22 (depicting an engine speed Ne—angular displacement characteristics) and FIG. 24 (depicting an engine rotating speed Ne—effect ratio [dB] characteristics), coil spring 106C is increased in angular displacement and also in equivalent spring constant as it comes near the resonance point. As a result, peaks of curves directed toward the resonance point gradually shift to a high rotating side, and due to this characteristics, troughs also enlarge, and a region (referred below to simply as an effect region) in which an effect is provided by antiresonance also enlarges, as compared with a fully linear spring characteristics which has the same spring constant as an equivalent spring constant, that is, the same frequency of antiresonance.

In addition, since coil spring 106C is non-linear in spring characteristics, rotational fluctuations differs when the engine rotating speed increases and decreases.

Further, the embodiment is constituted such that the spring constant is changed over between two stages (k1 and k2), and the equivalent spring constant is non-linear to be k1 until an angular displacement θ3 and to be gradually increased from k1 in a region beyond θ3. However, the spring constant may have a fully non-linear characteristics such that spaces between respective coils of the coil spring are gradually increased to thereby increase the spring constant from an angular displacement θ=0 as θ increases and to increase the equivalent spring constant from θ=0 as θ increases (as indicated by a dot-dash line in FIG. 23).

Furthermore, also in the case where the coil spring having a non-linear spring characteristics is designed to set frequency of antiresonance in accordance with the formula (6) in a manner to obtain an effect of reducing roll vibration of an engine, it is likewise possible to enlarge the region of such effect as well as to enhance a vibration reducing effect at the antiresonance point as compared with a spring (having the same spring constant as the equivalent spring constant of the non-linear spring) having a fully linear spring characteristics, as shown in FIG. 24.

Figure 25:
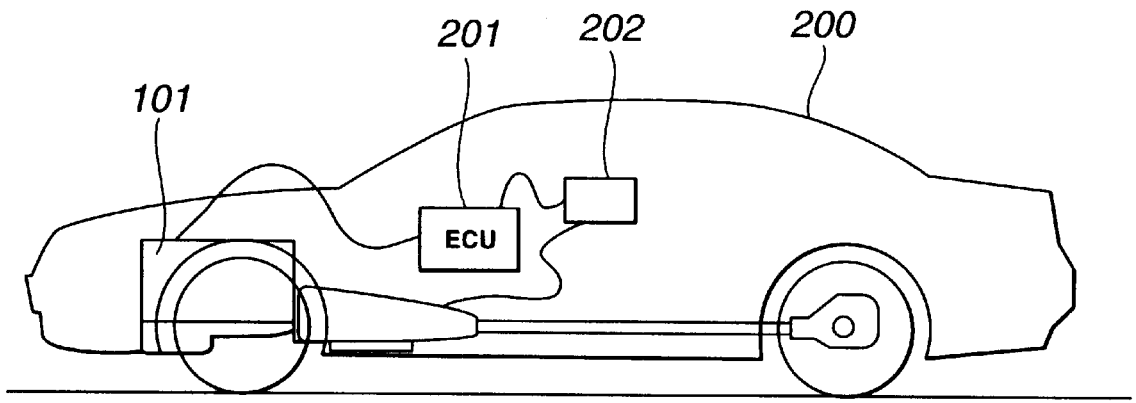
FIG. 25 is a schematic illustration of an automotive vehicle on which an internal combustion engine provided with a seventh embodiment of the vibration reducing system according to the present invention.

FIG. 25 illustrates a seventh embodiment of the vibration reducing system of the present invention. With this embodiment, a vibration reducing effect at idling operation is enhanced by mounting on A/T vehicle 200 the same engine 101 as that in the sixth embodiment, as shown in FIG. 25. In this engine, a command from engine control unit (ECU) 201 is used to modify or change idling engine speed in accordance with situations to effectively reduce roll vibration or rotational fluctuations of the engine.

Figure 26:
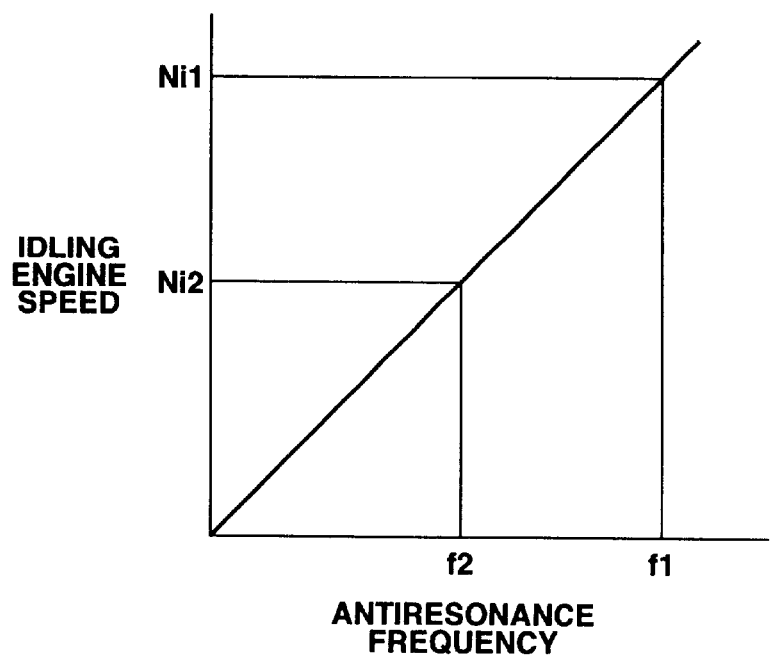
FIG. 26 is a graph showing the relationship between the antiresonance frequency and the idling engine speed in connection with the seventh embodiment of the vibration reducing system.

More specifically, as shown in FIG. 26, when the selector of an automatic transmission (A/T) is puts in the N (neutral) range and roll vibration of the engine becomes problematic, roll vibration is reduced by setting an idling engine speed Ni1 such that the fundamental harmonic component is coincident with a frequency $f_1$ represented by the formula (6). When the selector is puts in the D (drive) range and rotational fluctuations of the engine become problematic, the idling engine speed is changed over in accordance with situations so as to reduce the rotational fluctuations by setting an idling engine speed Ni2 such that the fundamental harmonic component is coincident with a frequency $f_2$ represented by the formula (7).

Figure 27:
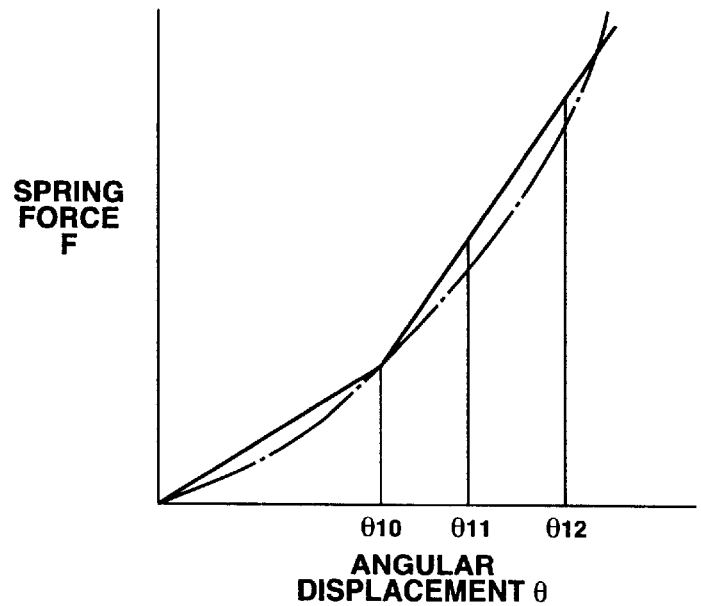
FIG. 27 is a graph showing the relationship between the angular displacement and the spring force in connection with the seventh embodiment of the vibration reducing system.

In this embodiment, the rotating shaft of the alternator rotates in the same direction as the rotational direction of an engine. In this case, antiresonance in rotational fluctuations occurs at a lower frequency ($f_2 < f_1$) than antiresonance in roll vibration, as shown in FIG. 27, due to the speed increasing ratio ρ>0 in the formulae (2) and (3). Accordingly, the hardness of the spring is set to become high at a smaller angular displacement $\theta_{10}$ than a maximum angular displacement $\theta_{11}$ at the time of antiresonance in rotational fluctuations. A maximum angular displacement at the time of antiresonance in roll vibration is represented by $\theta_{12}$. Also, the spring characteristics may be designed such that the spring constant is gradually increased in a region of larger angular displacements than $\theta_{10}$ (as indicated by a solid line in FIG. 27), and that the spring constant is gradually increased over an entire region including a region below $\theta_{10}$ (as indicated by a dot-dash line in FIG. 27).

More specifically, since rotational fluctuations and roll vibration generate in the course of an angular displacement θ increasing toward a single resonance point, setting of the above non-linear spring characteristics enables setting frequency $f_2$ of antiresonance in rotational fluctuations and frequency $f_1$ of antiresonance in roll vibration in a manner to meet the relationship $f_2<f_1$. Switching of idling engine speeds Ni1, Ni2 in conformity with these frequencies $f_1$, $f_2$ of antiresonance causes antiresonance at the respective idling engine speeds Ni1, Ni2 to enable obtaining a large vibration reducing effect for both roll vibration and rotational fluctuations. Also, since troughs having centers at antiresonance points are enlarged due to that characteristics in which the equivalent spring constant incrementally increases in front of and behind the respective antiresonance points, a region in which vibration is reduced by the respective antiresonances is also enlarged.

Figure 28:
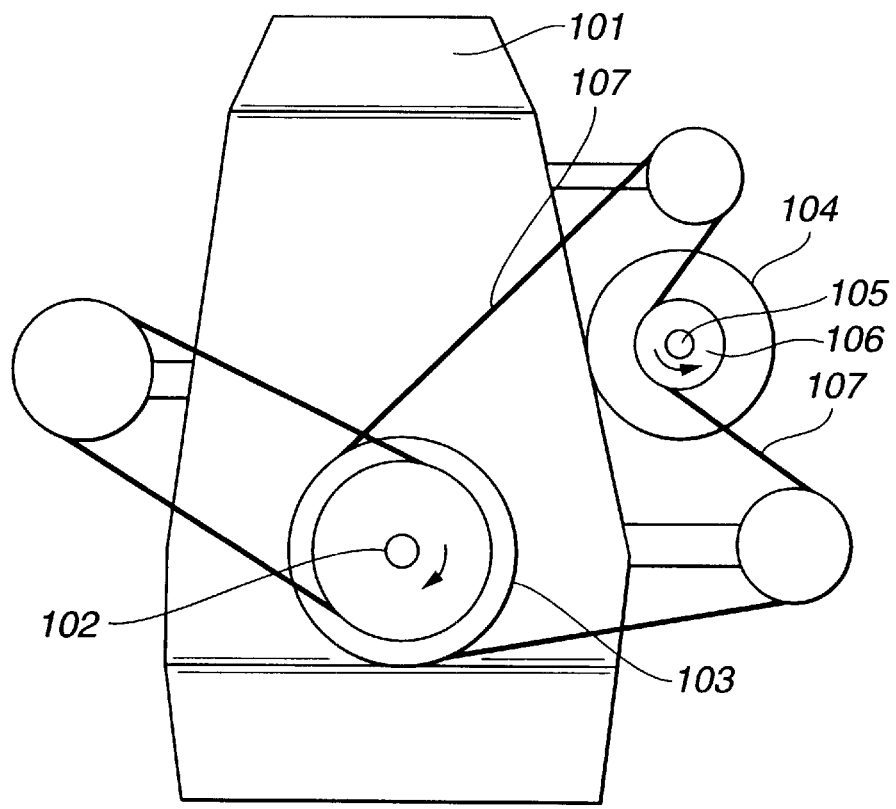
FIG. 28 is a schematic front view of an internal combustion engine provided with an eighth embodiment of the vibration reducing system according to the present invention.

FIG. 28 illustrates an eighth embodiment of the vibration reducing system of the present invention. In this embodiment, alternator pulley 106 of alternator 104 is brought in engagement with a back-side surface of accessory driving belt 107 to be driven for rotation in an opposite direction to a direction of rotation of the crankshaft of engine 101, in which a rotational vibration system or the vibration reducing system of the present invention is provided. With this arrangement in which the rotating section of alternator 104 is driven to be rotated in the opposite direction to the direction of rotation of the crankshaft of engine 101, the speed increasing ratio becomes ρ<0 in the formula (6) which represents frequency $f_1$ of antiresonance in roll vibration to reduce the frequency $f_1$ to make antiresonance come off a resonance point, so that a maximum angular displacement can be made small, and in particular, a large effect of reduction is obtained for roll vibration.

Figure 29:
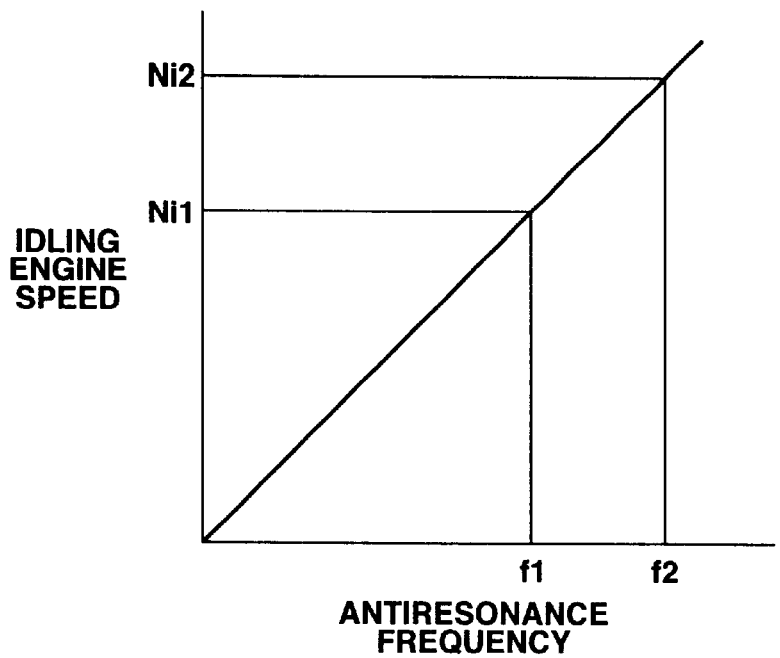
FIG. 29 is a graph showing the relationship between the antiresonance frequency and the idling engine speed in connection with the eighth embodiment of the vibration reducing system.
Figure 30:
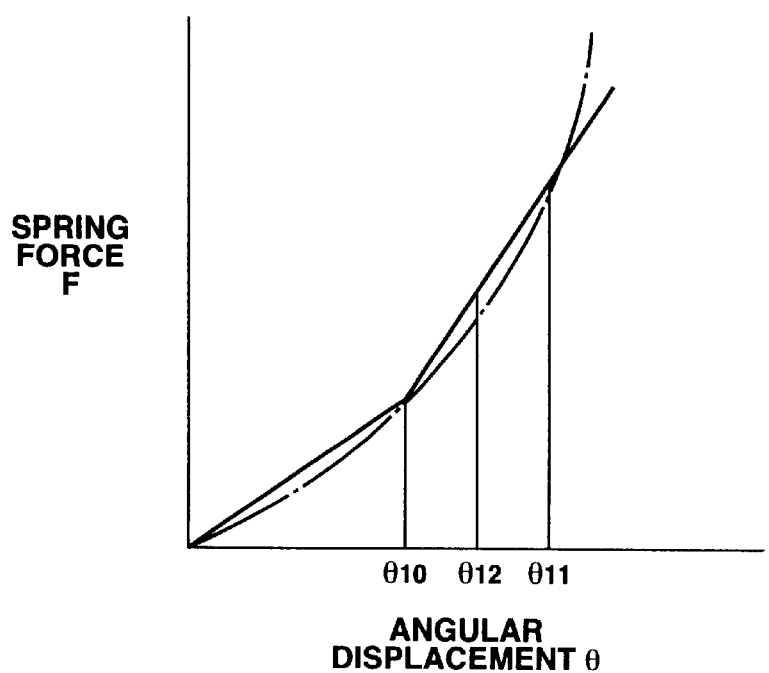
FIG. 30 is a graph showing the relationship between the angular displacement and the spring force in connection with the eighth embodiment of the vibration reducing system.

Also in the case where the rotating section of alternator 104 rotates in a direction opposite to that of rotation of the crankshaft of engine 101, antiresonance in roll vibration occurs at a lower frequency ($f_1<f_2$) than antiresonance in rotational fluctuations. Accordingly, the spring may be set to become hard at a smaller angular displacement $θ_{10}$ than a maximum angular displacement $θ_{12}$ at the time of antiresonance in roll vibration, as shown in FIGS. 29 and 30, and additionally idling engine speeds Ni1, Ni2 may be changed over in conformity with frequencies $f_1$, $f_2$ of respective antiresonances in roll vibration and rotational fluctuations, which frequencies are set by the spring characteristics.

In this way, similarly to the fifth embodiment, antiresonance can be caused at idling rotating speeds Ni1, Ni2 to provide for large vibration reducing effects for both rotational fluctuations and roll vibration and to enlarge regions of the respective effects.

Figure 31A:
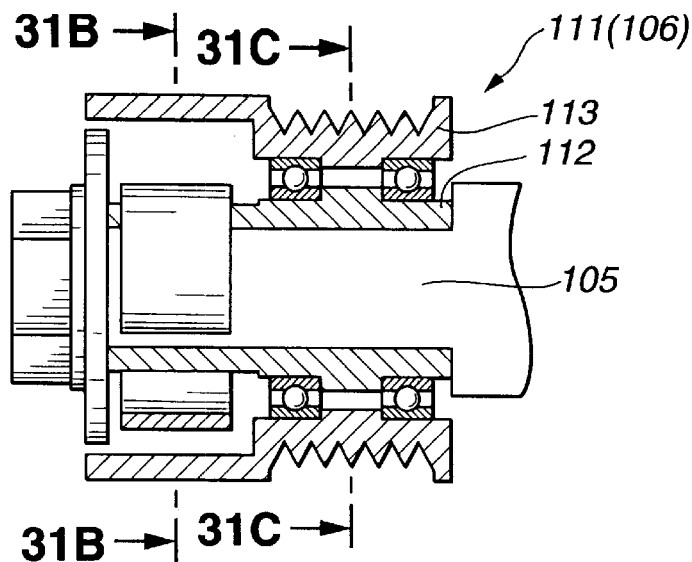
FIG. 31A is a cross-sectional view of an alternator pulley of an alternator of an internal combustion engine provided with a ninth embodiment of the vibration reducing system according to the present invention, taken in the direction of arrows substantially along the line of 31A—31A of FIG. 31B.
Figure 31B:
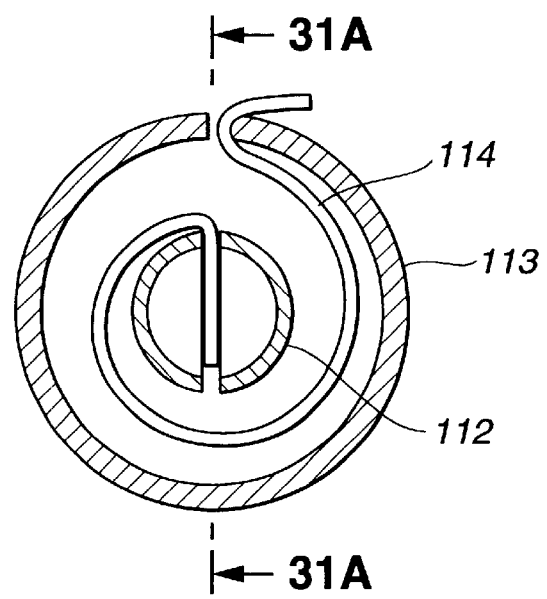
FIG. 31B is a cross-sectional view taken in the direction of arrows substantially along the line 31B—31B of FIG. 31A.
Figure 31C:
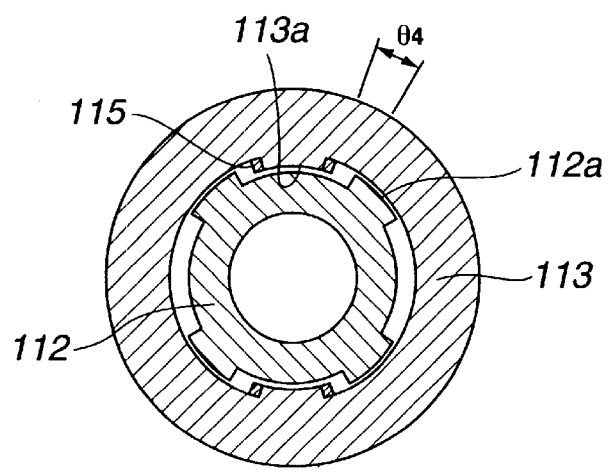
FIG. 31C is a cross-sectional view taken in the direction of arrows substantially along the line 31C—31C of FIG. 31A.

FIGS. 31A to 31C illustrate a ninth embodiment of the vibration reducing system of the present invention, similar to the first embodiment of FIGS. 18A to 21 except for the arrangement of the alternator pulley 106 (111).

In this embodiment, a rotational vibration system includes alternator pulley 111 (106) which has, as shown in FIGS. 31A to 31C, two parts, that is, inner peripheral portion 112 which is directly joined to rotating shaft 105 through bearing, and outer peripheral portion 113 around which accessory drive belt 107 is trained or passed. The outer peripheral portion 113 is rotatably supported on rotating shaft 105. The inner and outer peripheral portions 112, 113 are rotatably coupled with each other through spiral spring 114 which is an elastic member.

Thus, in this embodiment, spiral spring 114 as an elastic member is provided in a rotational vibration system, as shown in FIGS. 31A to 31C, and positioned between inner peripheral portion 112 and outer peripheral portion 113 of alternator pulley 111. Additionally, a plurality of outwardly projecting stoppers 112a are provided on an outer peripheral surface of inner peripheral portion 112, and a plurality of inwardly projecting stoppers 113a are provided on an inner peripheral surface of outer peripheral portion 113, so that relative angular displacement between inner peripheral portion 112 and outer peripheral portion 113 is restricted. In addition, rubber pieces 115 are bonded to respective sides of stoppers 113a on the side of outer peripheral portion 113, against which stoppers 112a inner peripheral portions 112 strike. Rubber pieces 115 lessen hammering sounds generated at the time of collision between stoppers 112a, 113a.

Figure 32:
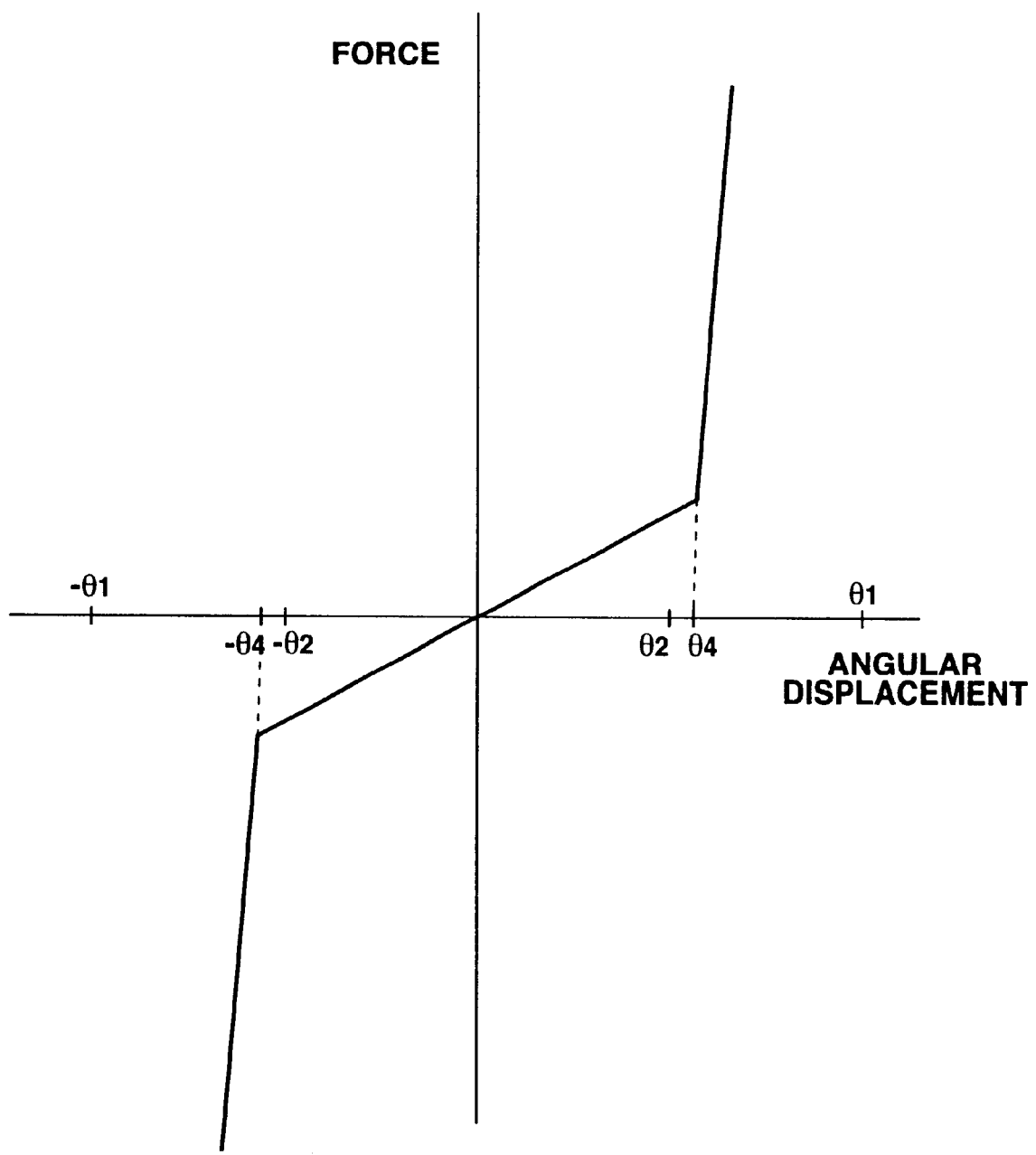
FIG. 32 is a graph showing the relationship between the rotational angular displacement and the spring force in connection with the ninth embodiment of the vibration reducing system.
Figure 33:
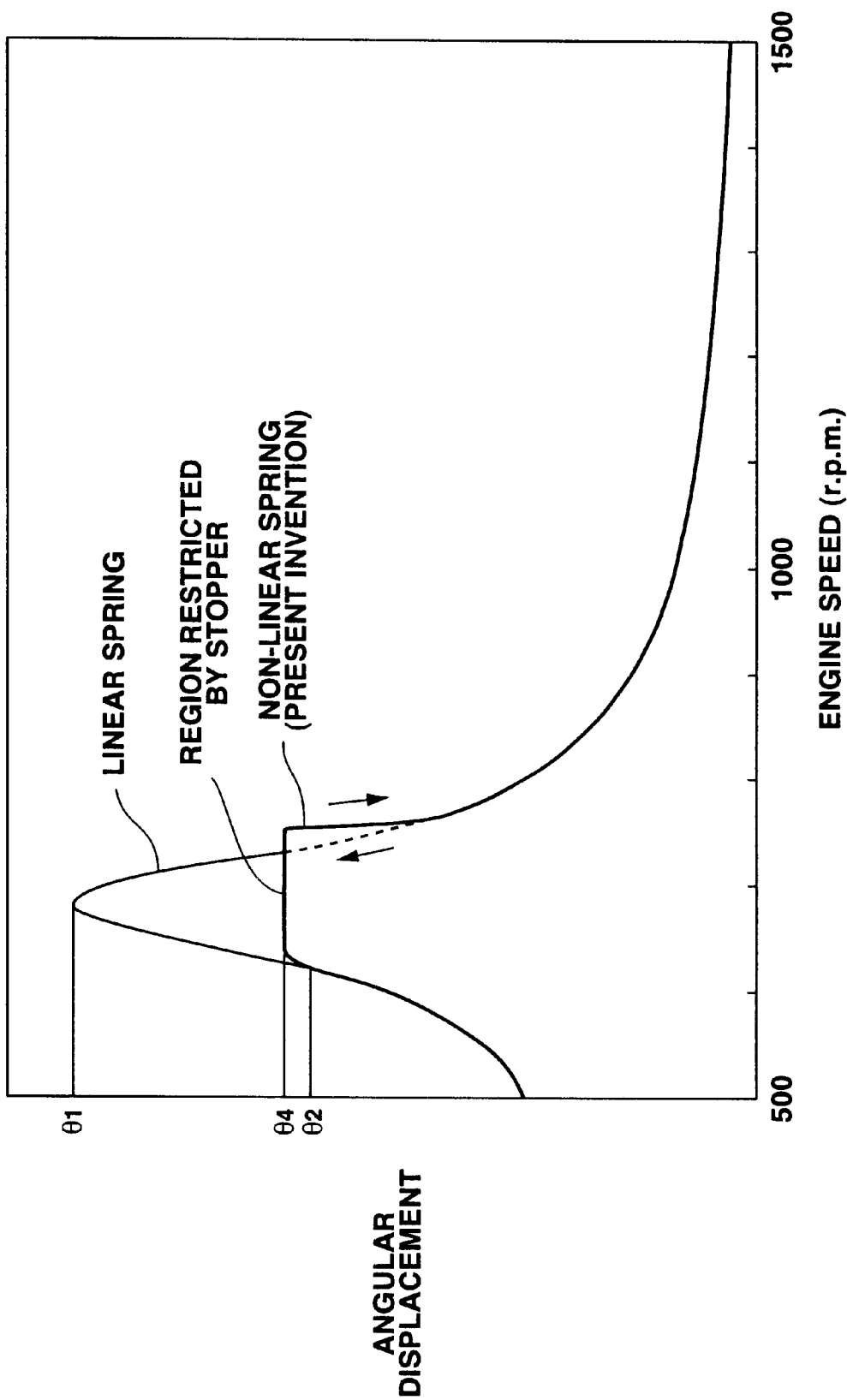
FIG. 33 is a graph showing the relationship between the engine speed and the rotational angular displacement in connection with the ninth embodiment of the vibration reducing system.

Here, spiral spring 114 alone has a spring characteristics which is substantially linear relative to angular displacement between the inner and outer peripheral portions. However, stoppers 112a, 113a restrict an angular displacement above a certain amount to thereby providing a non-linear characteristics to the spiral spring, as shown in FIG. 32. In addition, after stoppers 112a, 113a abut against each other, elastic deformation of rubber pieces 115 provides a little angular displacement between the inner and outer peripheral portions In the case of a fully linear spring which has the same spring constant as that of spiral spring 114 and is not restricted in angular displacement, angular displacement (between inner peripheral portion 112 and outer peripheral portion 113) takes a maximum angular displacement θ1 near resonance of the rotational vibration system as shown in FIG. 33 and angular displacement at the time of antiresonance assumes a smaller angular displacement θ2, as already discussed. In this connection, angular displacement θ4 restricted by stoppers 112a, 113a is set to take a somewhat larger value than the maximum angular displacement θ2 at the time of antiresonance.

Figure 34:
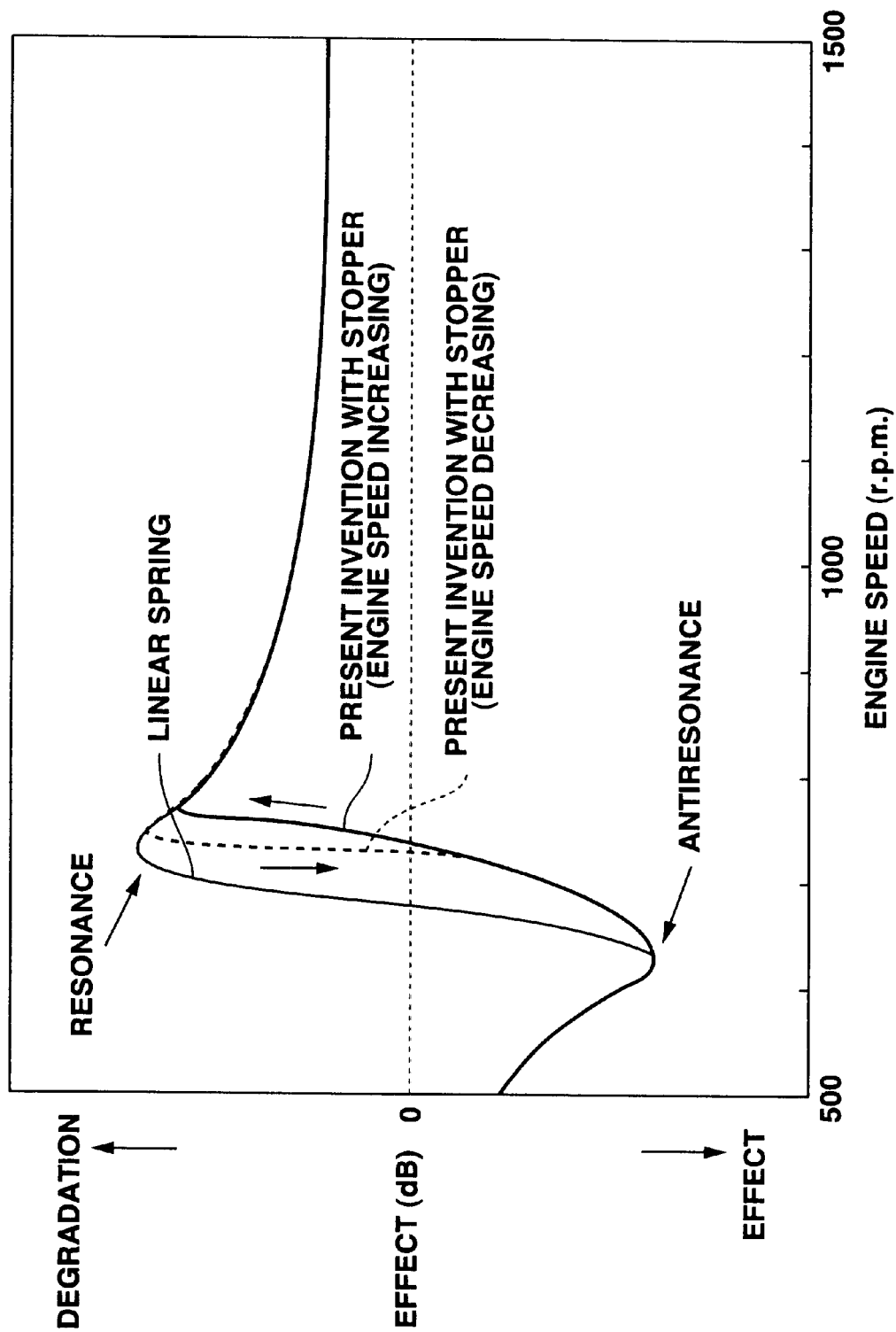
FIG. 34 is a graph showing the relationship between the engine speed and effects in connection with the ninth embodiment of the vibration reducing system.

In the case where a non-linear spring characteristics is obtained by restraining an angular displacement with the use of stoppers, frequency of antiresonance varies much owing to fluctuations in load to get no stability. This is because when angular displacement θ4 restrained by the stoppers is set to a smaller value than the maximum angular displacement θ2 at the time of antiresonance, the stoppers strike against one another to cause sudden changes in the spring constant. Accordingly, since antiresonance is generated in a linear region by setting θ4 to be larger than θ2, a vibration reducing effect can be obtained at stable frequencies, as shown in FIG. 34. Also, in a region of higher rotational speed than that, the non-linear characteristics provided by an increase in spring constant is effective in enabling enlarging a region in which antiresonance is effective, as well as reducing deterioration in resonance while shifting frequency of resonance to a side of high rotational speed.

Next, a tenth embodiment of the vibration reducing system of the present invention will be discussed.

In this embodiment, the rotational vibration system in the ninth embodiment is mounted on the A/T vehicle shown in FIG. 25 like in the seventh embodiment, in which an idling engine speed is changed in accordance with a condition so as to effectively reduce roll vibration or rotational fluctuations of an engine.

Here, with an arrangement in which the alternator is mounted and driven so that its rotating section rotates in the same direction as that of the crankshaft of an engine as shown in FIGS. 18A and 18B), antiresonance in rotational fluctuations rather than antiresonance in roll vibration occurs at a low frequency. Accordingly, when the stopper are set in a manner to restrict the angular displacement than a maximum angular displacement at the time of antiresonance in roll vibration, it is possible to stably obtain an effect of reducing antiresonance both in roll vibration and rotational fluctuations in the same manner as in the seventh embodiment, and to decrease deterioration in resonance while enlarging a region where antiresonance is effective.

Figure 35A:
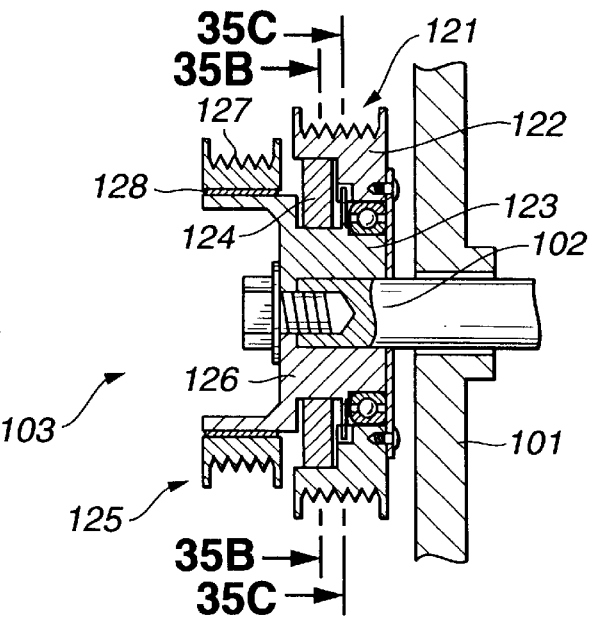
FIG. 35A is a cross-sectional view of a crank pulley used in an internal combustion engine provided with an eleventh embodiment of the vibration reducing system according to the present invention, taken in the direction of arrows substantially along the line 35A—35A of FIGS. 35B and 35C.
Figure 35B:
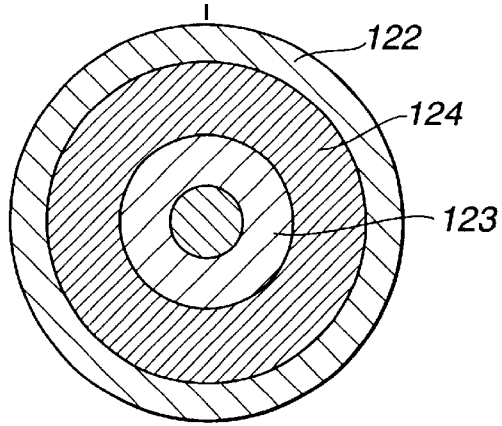
FIG. 35B is a cross-sectional view taken in the direction of arrows substantially along the line 35B—35B of FIG. 35A.
Figure 35C:
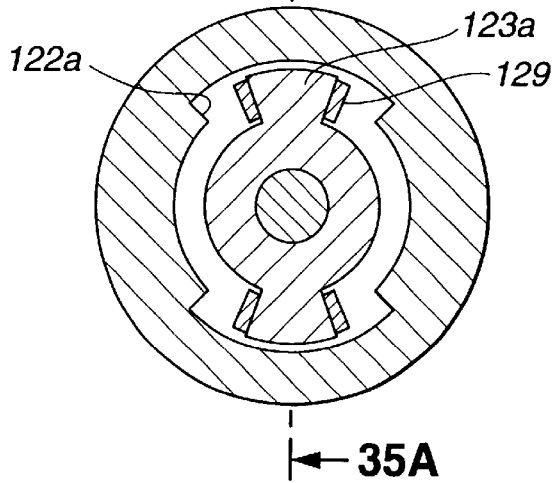
FIG. 35C is a cross-sectional view taken in the direction of arrows substantially along the line 35C—35C of FIG. 35A.

FIGS. 35A to 35C illustrate an eleventh embodiment of the vibration reducing system of the present invention, similar to the sixth embodiment. While an elastic member of a rotational vibration system is provided on the alternator in the sixth embodiment, an elastic member is provided on a crank pulley 121 mounted on the crankshaft or engine rotating shaft 102 in this embodiment.

More specifically, as shown in FIGS. 35A to 35C, in the crank pulley 121 located axially inside relative to the engine 101, rubber layer 124 serving as the elastic member of the rotational vibration system is provided between outer peripheral portion 122 which has a relatively large diameter and around which a belt for driving the alternator is trained or passed, and inner peripheral portion 123 having a relatively small diameter. Similarly to the above-mentioned embodiments, stoppers 122a, 123a are formed on outer peripheral portion 122 and inner peripheral portion 123 to strike against each other for restriction of angular displacement. Rubber elastomeric pieces 129 are bonded to stoppers 122a for prevention of hammering sounds.

With such an arrangement, a similar effect of antiresonance can be obtained under the fact that the elastic member is provided between the engine rotating shaft and the alternator rotating shaft, similarly to the above-discussed embodiments. Besides, accessories other than an alternator are driven through rubber layer 124, and therefore they are included in a mass (rotational inertial mass) thereby to enlarging the mass.

In addition, crank pulley 125 located axially outside relative to the engine 101 is divided into inner peripheral portion 126 and outer peripheral portion 127 between which rubber layer 128 is interposed. The spring constant of rubber layer 12 and inertial moment of outer peripheral portion 127 are tuned so as to have torsional resonance of a crank shaft acting as a dynamic damper.

It will be understood that the alternator may contribute to improve the effects of antiresonance for, in particular, roll vibration when rotatingly driven in an opposite direction to a direction of rotation of the crankshaft of an engine as shown in FIG. 28.

Additionally, degradation in resonance can be minimized while enlarging a region where antiresonance is effective, by mounting the engine (shown in FIGS. 35A to 35C) on an A/T vehicle in the same manner as that in the seventh embodiment, and by varying an idling engine speed in accordance with a condition to effectively reduce roll vibration and rotational fluctuations of the engine.

Figure 36A:
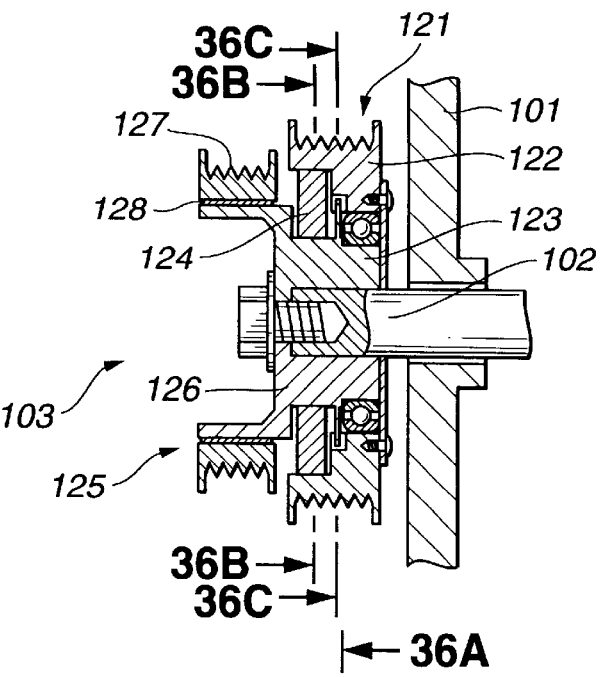
FIG. 36A is a cross-sectional view of a crank pulley used in an internal combustion engine provided with a twelfth embodiment of the vibration reducing system according to the present invention, taken in the direction of arrows substantially along the line 36A—36A of FIGS. 36B and 36C.
Figure 36B:
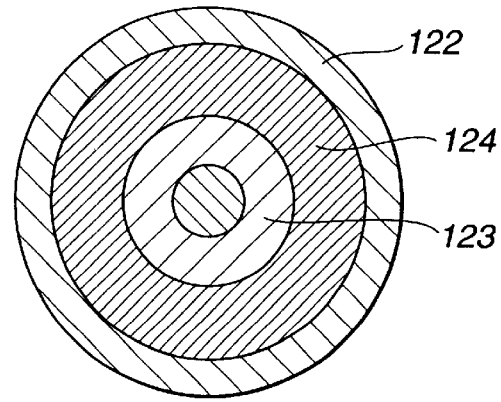
FIG. 36B is a cross-sectional view taken in the direction of arrows substantially along the line 36B—36B of FIG. 36A.
Figure 36C:
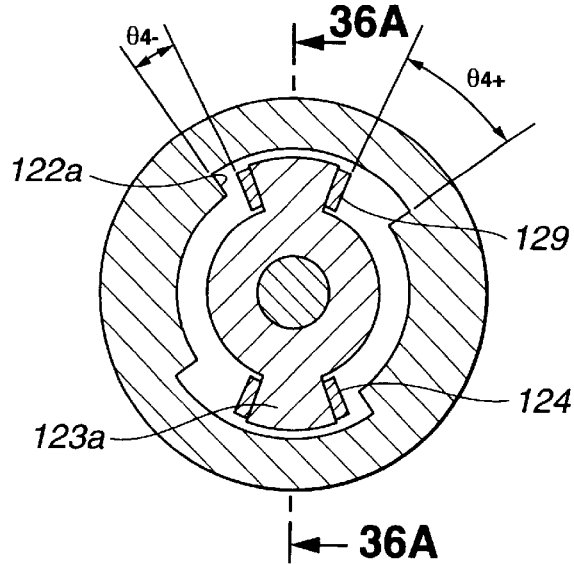
FIG. 36C is a cross-sectional view taken in the direction of arrows substantially along the line 36C—36C of FIG. 36A.

FIGS. 36A to 36C illustrate a twelfth embodiment of the vibration reducing system of the present invention, similar to the eleventh embodiment of FIGS. 35A to 35C.

In this embodiment, angular displacement between the inner and outer peripheral portions and restricted by stoppers in the eleventh embodiment is set to take different values $\theta 4_+$, $\theta 4_-$ on sides of a normal direction (same as that of the crankshaft) rotation and an opposite direction (opposite to that of the crankshaft) rotation, as shown in FIGS. 36A to 36C. More specifically, since the engine generates a drive force such as frictional forces and the like even in idling operation, fluctuations in drive torque thereof are usually large on a plus side (the above normal direction rotation) in a direction of rotation and smaller on a minus side (the above-mentioned opposite-direction rotation) in the direction of rotation.

Figure 37:
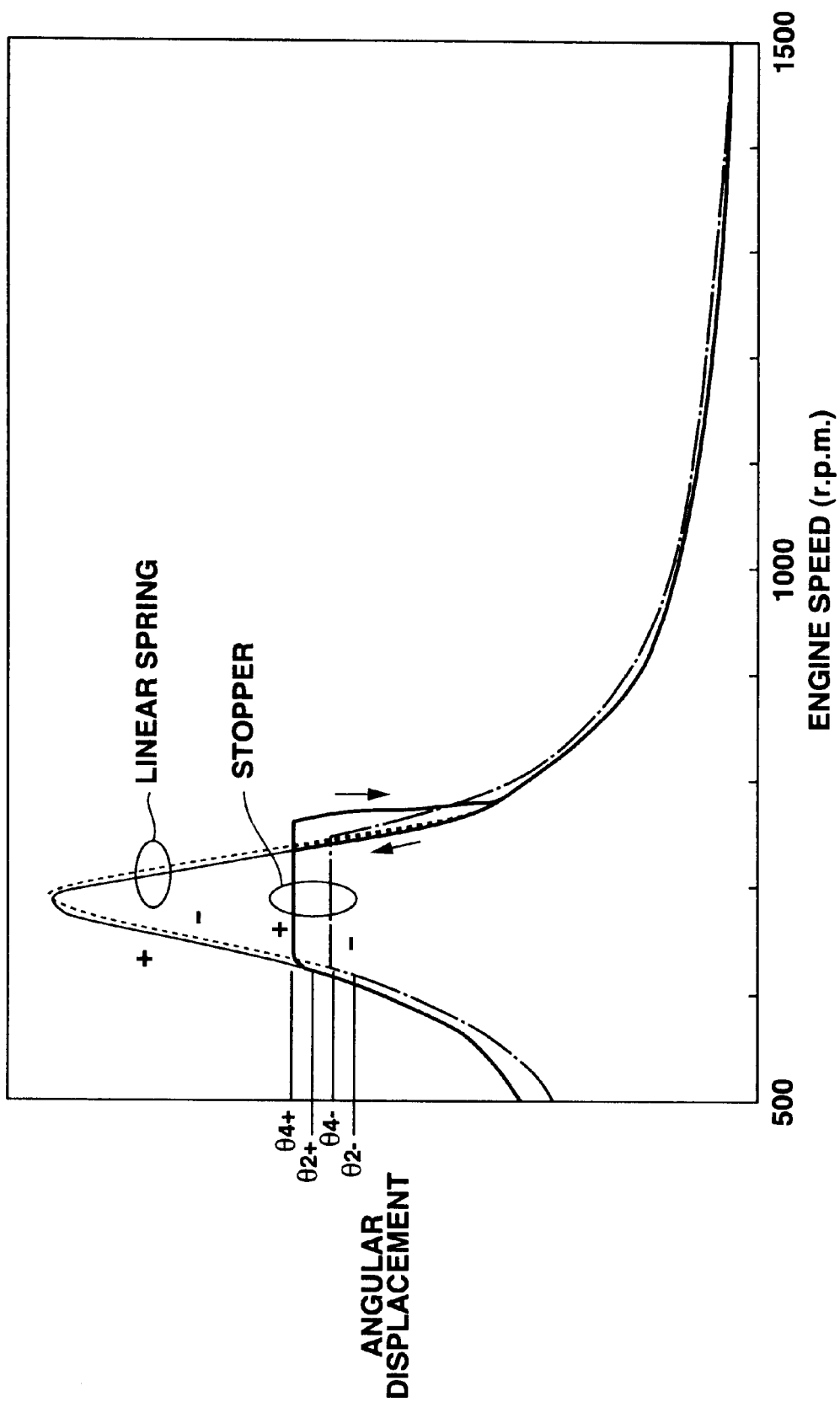
FIG. 37 is a graph showing the relationship between the engine speed and the rotational angular displacement in connection with the twelfth embodiment of the vibration reducing system.

Therefore, as depicted in FIG. 37, displacement of deformation of rubber layer 124 (elastic member) at the time of antiresonance becomes relatively large to take an angular displacement $\theta 2_+$ when the engine rotating shaft is rotated in the normal direction and becomes relatively small to take an angular displacement $\theta 2_-$ when the engine rotating shaft is rotated in the opposite direction. Accordingly, angular displacements restricted by stoppers in the respective directions are set to different values $\theta 4_+$, $\theta 4_-$ so that they are made somewhat larger than maximum angular displacements $\theta 2_+$, $\theta 2_-$ in the respective directions at the time of antiresonance in rotational fluctuations. As a result, the peripheral portions can be made to more surely strike against the stoppers to further enlarge regions where antiresonance is effective.

Figure 38A:
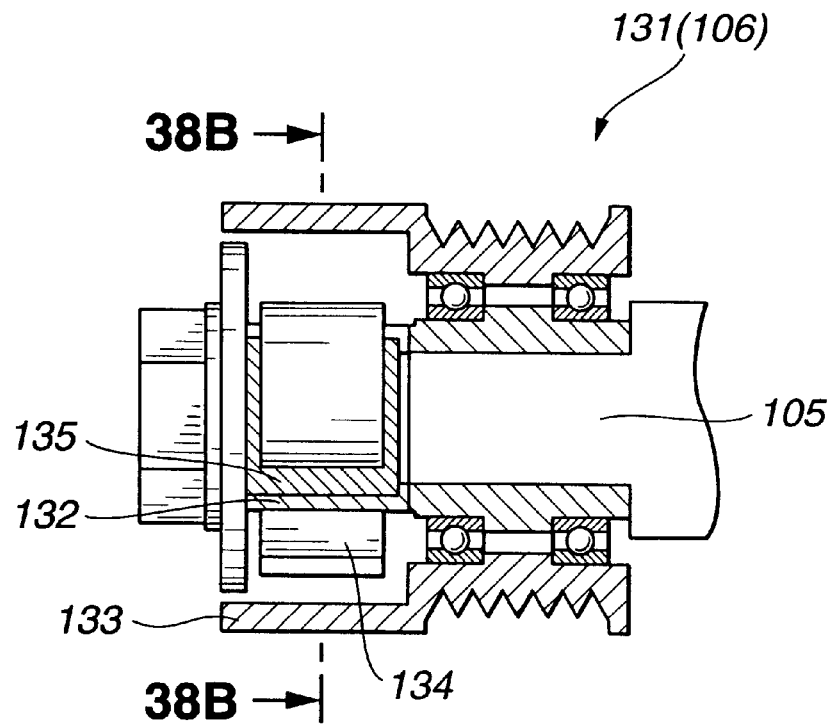
FIG. 38A is a cross-sectional view of an alternator pulley of an alternator used in an internal combustion engine provided with a thirteenth embodiment of the vibration reducing system, taken in the direction of arrows substantially along the line 38A—38A of FIG. 38B.
Figure 38B:
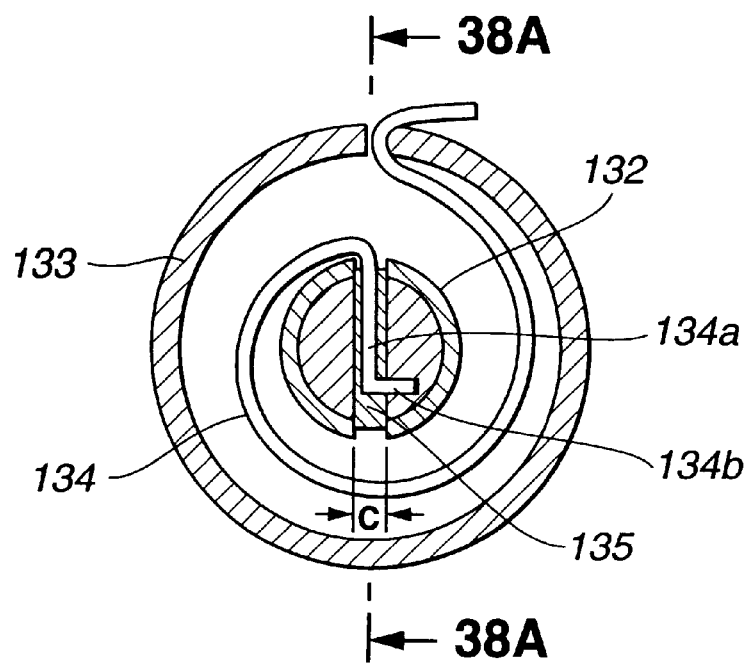
FIG. 38B is a cross-sectional view taken in the direction of arrows substantially along the line 38A—38A of FIG. 38A.

FIGS. 38A and 38B illustrate a thirteenth embodiment of the vibration reducing system of the present invention, similar to the ninth embodiment except for the arrangement of the alternator pulley 111 (131).

Figure 39:
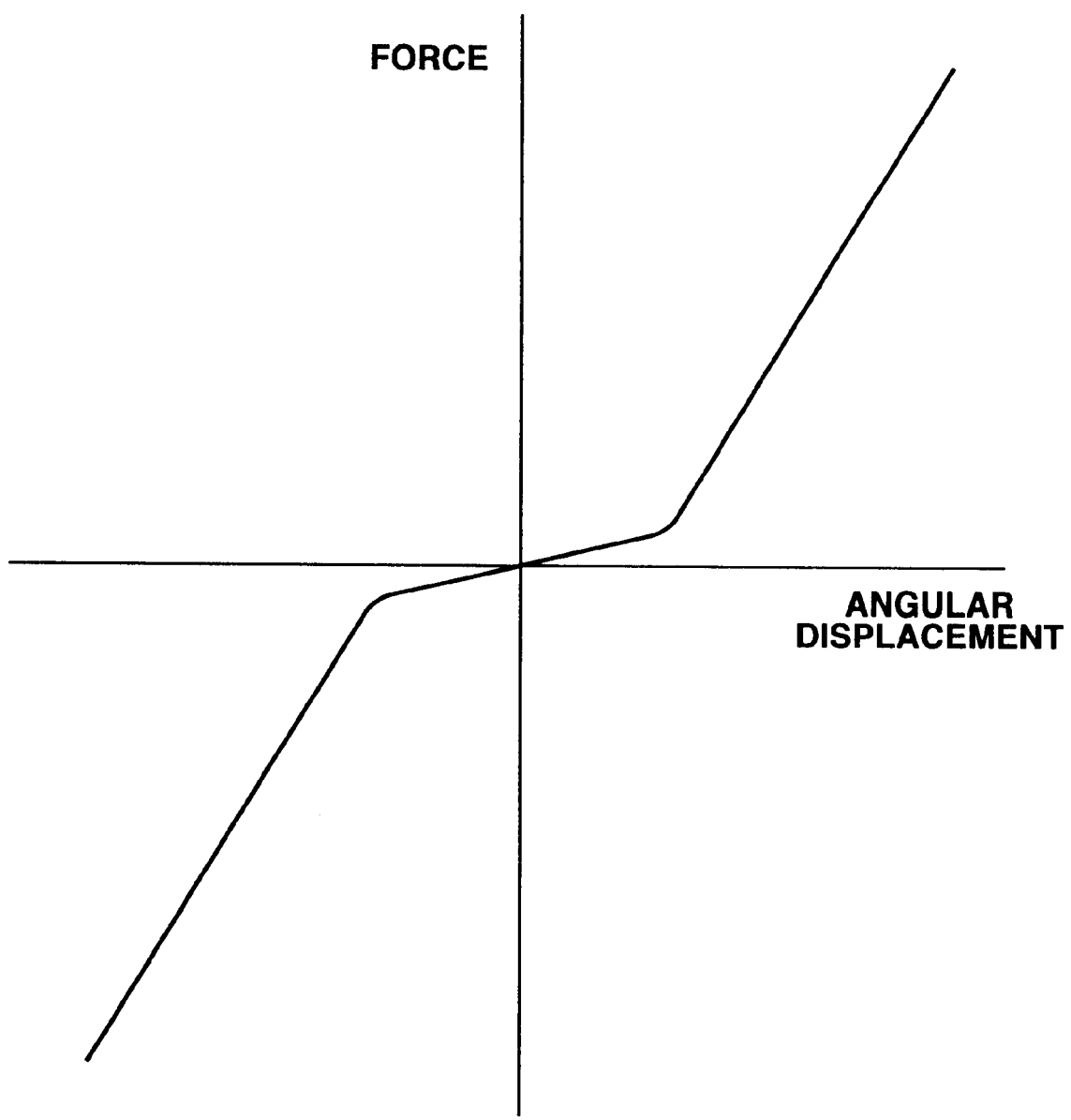
FIG. 39 is a graph showing the relationship between the rotational angular displacement and the spring force in connection with the thirteenth embodiment of the vibration reducing system.

In this embodiment, in the alternator pulley 131 (111) forming a rotational vibration system as shown in FIGS. 38A and 38B, spiral spring 134 is mounted or interposed between inner peripheral portion 132 and outer peripheral portion 133 of alternator pulley 131 in the same manner as that in the ninth embodiment. Spiral spring 134 is assembled to inner peripheral portion 132 a clearance C into which rubber member 135 sufficiently soft relative to spring rigidity of spiral spring 134 is inserted. Consequently, alternator pulley 131 has such a non-linear characteristics as shown in FIG. 39 that its spring constant becomes sufficiently small near angular displacement of zero where spiral spring 134 does not act and only soft rubber member 135 acts as a spring.

In the rotational vibration system constructed in such a manner, resonance can be also caused by rotational elasticity given by spiral spring 134 and a mass composed of the main flywheel 108 mounted to the crankshaft and the rotor portion A of the alternator. At this time, antiresonance is caused under the resonance, for roll vibration and rotational fluctuations of an engine, in which respective frequencies at the time of resonance and antiresonance in the case of a fully linear spring mounted without clearance C are represented by the formulae (5) to (7).

Figure 40:
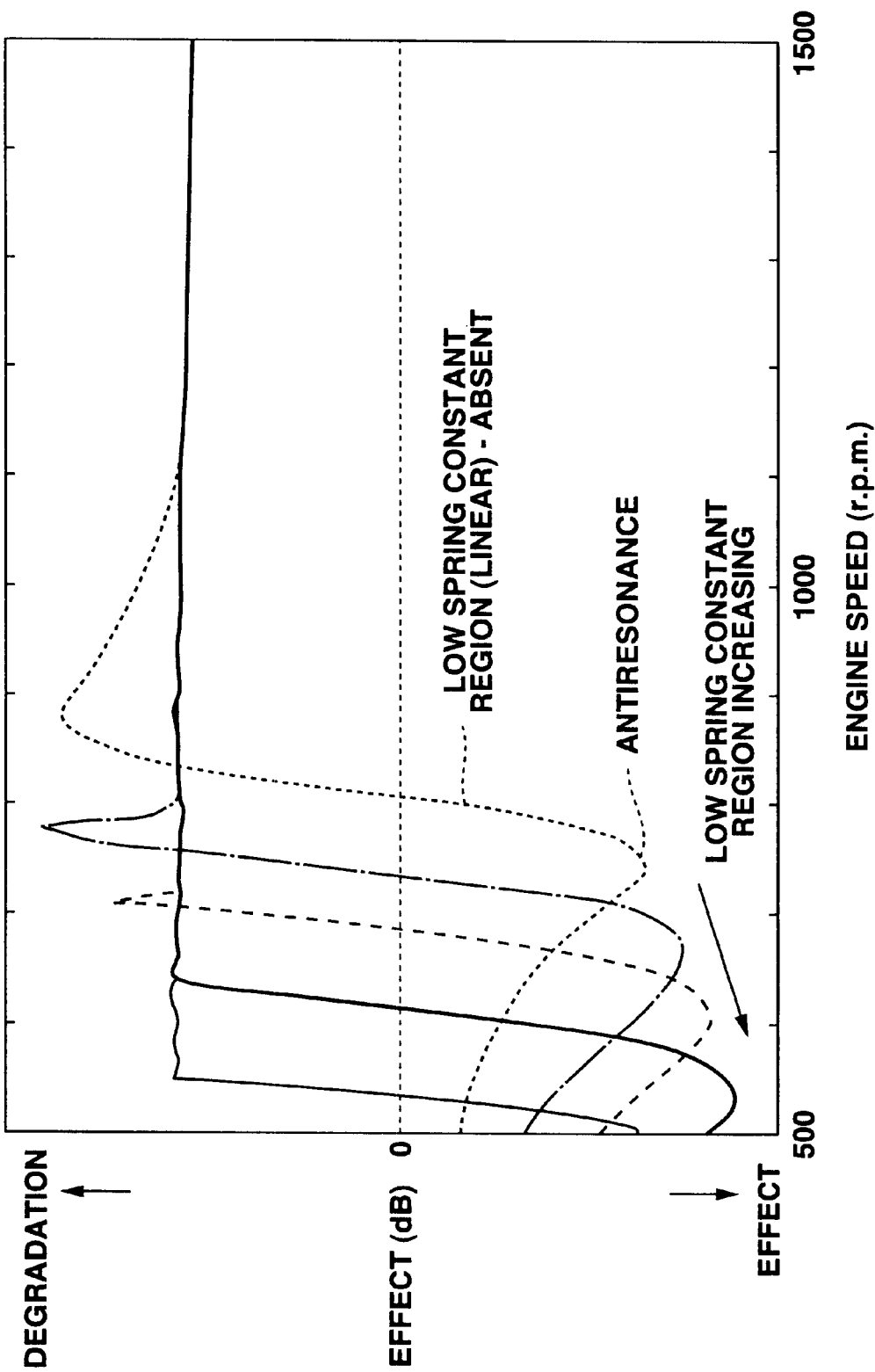
FIG. 40 is a graph showing the effects of the low spring constant region in connection with the thirteenth embodiment of the vibration reducing system.

In contrast, when a region (low spring region), in which the spring constant is adequately small, is present near an angular displacement of 0 as in this embodiment, frequency of antiresonance is lower than that with a linear spring characteristics as the larger the low spring region is, as shown in FIG. 40. In this regard, in the same manner as in the sixth embodiment, the spring constant of spiral spring 134, the inertial moment of alternator pulley 31, the speed increasing ratio ρ and the magnitude of clearance C are adjusted in accordance with the above formula (6) or (7) in such a manner that antiresonance generates at frequency (for example, 20 Hz for idling engine speed of 600 rpm) for 2nd rotational speed of idling engine speed.

Figure 41:
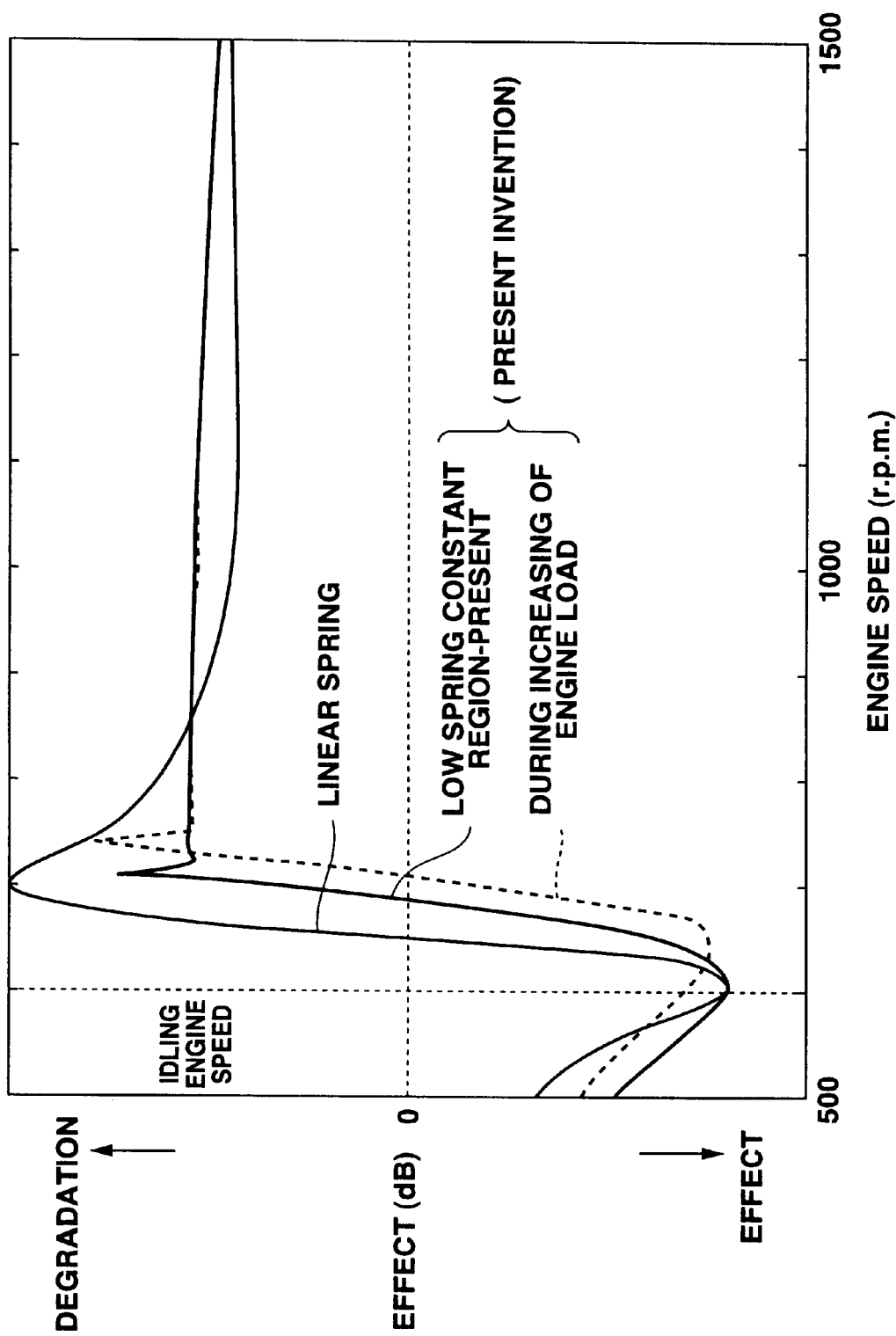
FIG. 41 is a graph showing the relationship between the engine speed and the effects in connection with the thirteenth embodiment of the vibration reducing system.

In this embodiment, frequency of antiresonance is set in a manner to provide for an effect of reducing, in particular, rotational fluctuations, which effect is as shown in FIG. 41. In this manner, when a region of low elasticity with a spring being adequately soft near angular displacement of zero is present, deterioration in resonance becomes small as compared with the case, in which a spring characteristics is linear, and a region of resonance can be made narrow while a region in which antiresonance is effective can be made large. Further, in the case where engine load increases for driving of accessories such as an air compressor and the like, an engine must be correspondingly raised in engine speed; however, due to the non-linear spring characteristics, an engine speed at which cause resonance and antiresonance is caused rises with an increase in spring constant, and therefore it is possible to obtain an effect of antiresonance in a large running region.

Additionally, rubber member 135 in clearance C can suppress hammering sounds generated when spiral spring 134 collides against inner peripheral portion 132. Further, tip end 134b of straight portion 134a of spiral spring 134 embedded in rubber member 135 is bent to be inserted into a groove of inner peripheral portion 132. Consequently, movement of straight portion 134a in a longitudinal direction thereof can be restricted thereby preventing an effect of antiresonance from being reduced owing to frictional loss during movement of the straight portion in the longitudinal direction.

Figure 42A:
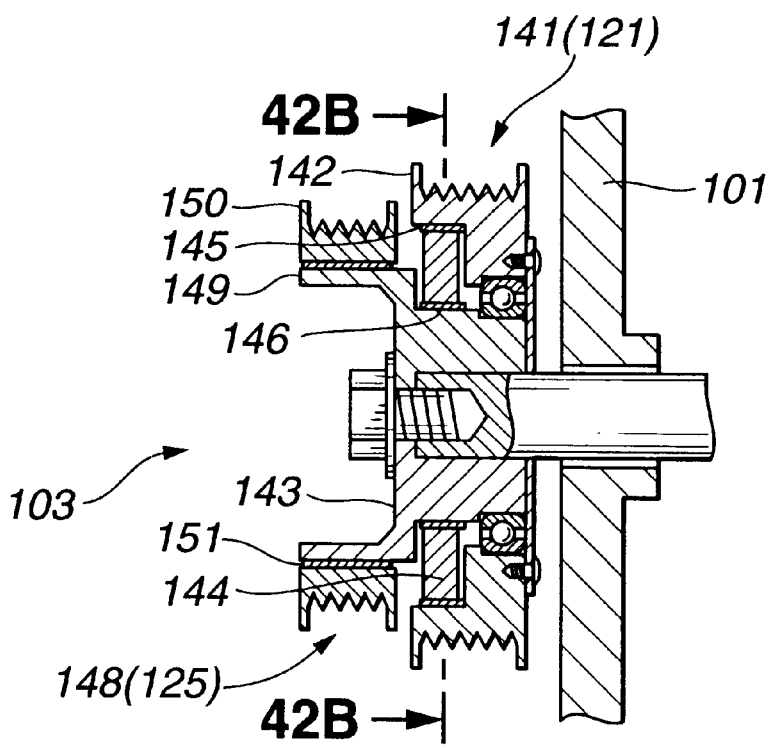
FIG. 42A is a cross-sectional view of a crank pulley used in an internal combustion engine provided with a fourteenth embodiment of the vibration reducing system according to the present invention, taken in the direction of arrows substantially along the line 42A—42A of FIG. 42B.
Figure 42B:
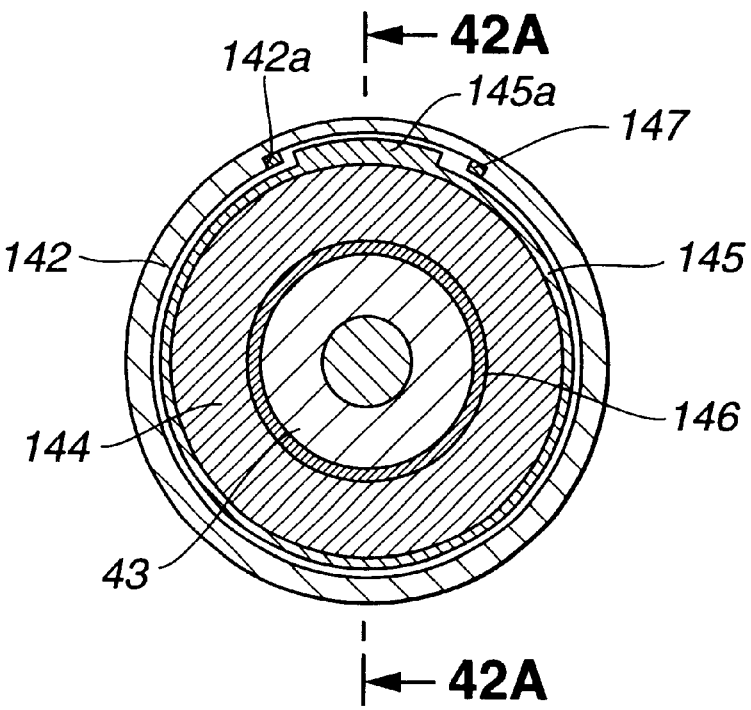
FIG. 42B is a cross-sectional view taken in the direction of arrows substantially along the line 42B—42B of FIG. 42A.

FIGS. 42A and 42B illustrate a fourteenth embodiment of the vibration reducing system of the present invention, similar to the eleventh embodiment for the arrangement of the crank pulley 121 (141).

Figure 43:
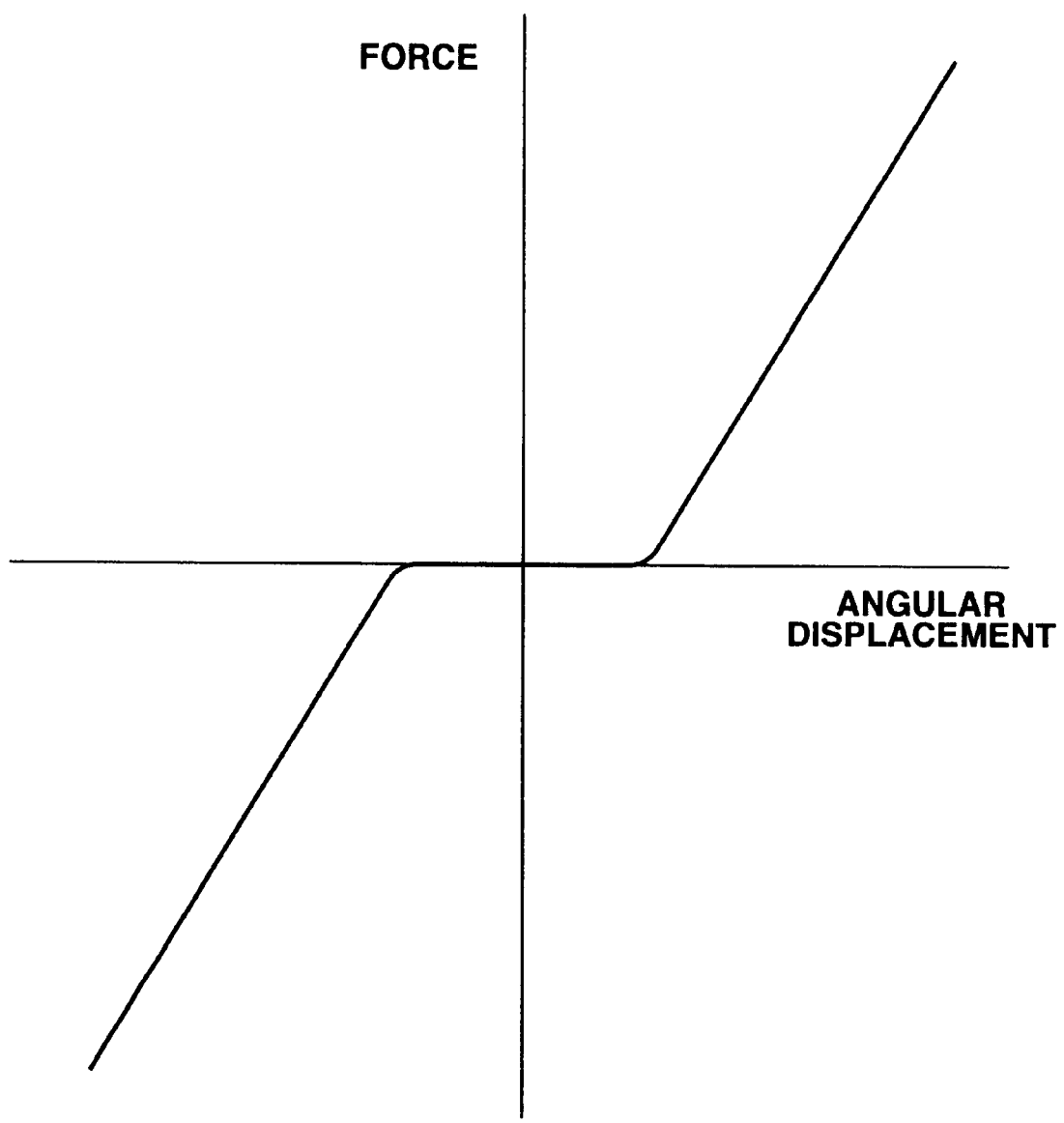
FIG. 43 is a graph showing the relationship between the rotational angular displacement and the spring force in connection with the fourteenth embodiment of the vibration reducing system.

In this embodiment, a spring having a non-linear spring characteristics as in the thirteenth embodiment is provided on the crank pulley 141 (121). More specifically, as shown in FIGS. 42A and 42B, in the crank pulley 141 located axially inside relative to the engine 101, rubber layer 144 serving as an elastic member of the rotational vibration system is provided between outer peripheral portion 142 having a relatively large diameter and inner peripheral portion 143 having a relatively small diameter, in the same manner as that in the eleventh embodiment. In this embodiment, both outer and inner peripheral sides of rubber layer 144 are welded and fixedly mounted to metal sleeves 145, 146. Inner peripheral side sleeve 146 is press-fitted onto inner peripheral portion 143 to be completely fixed thereto. In contrast, outer peripheral side sleeve 145 is made freely rotatable relative to the outer peripheral portion 142 with a gap between it and outer peripheral portion 142 of crank pulley 141. Additionally, stopper 145a is provided extending outward from outer peripheral side sleeve 145. Stoppers 142a are formed by recessing outer peripheral portion 142 of crank pulley 141 inward so that the outer peripheral side sleeve freely rotates until stoppers 145a, 142a strike against each other. Rubber layer 144 functions as a spring when the outer peripheral side sleeve performs a further angular displacement. Rubber members 147 are attached to both sides of stoppers 142a of outer peripheral portion 142 in order to suppress hammering sounds generated when the stoppers collide against stopper 145a of sleeve 145. With the above-mentioned construction, a non-linear spring characteristics as shown in FIG. 43 can be obtained.

In this embodiment, the spring constant of rubber layer 144, the inertial moment of the alternator rotor portion, the speed increasing ratio ρ, and the magnitude of allowable rotary angle of the stoppers are adjusted so as to reduce roll vibration of the engine and to cause antiresonance of roll vibration to be coincident with the fundamental harmonic component frequency of idling engine speed.

Additionally, similarly to the sixth embodiment, rubber layer 151 serving as a dynamic damper for suppressing torsional resonance of the crankshaft is provided between inner peripheral portion 149 and outer peripheral portion 150 of crank pulley 148 which is located axially outside relative to the engine.

This embodiment constructed in the above-mentioned manner can produce the same effect of antiresonance as that in the case of provision on an alternator by the same reason as described in the eleventh embodiment, and can adopt a large mass (inertial mass). Additionally, the provision of the non-linear spring characteristics can reduce deterioration in resonance with respect to roll vibration of the engine, as shown in FIG. 44, in the same manner as in the eighth embodiment, narrow a region of resonance, enlarge a region in which antiresonance is effective, and produce an effect of antiresonance in a large running region.

Figure 45A:
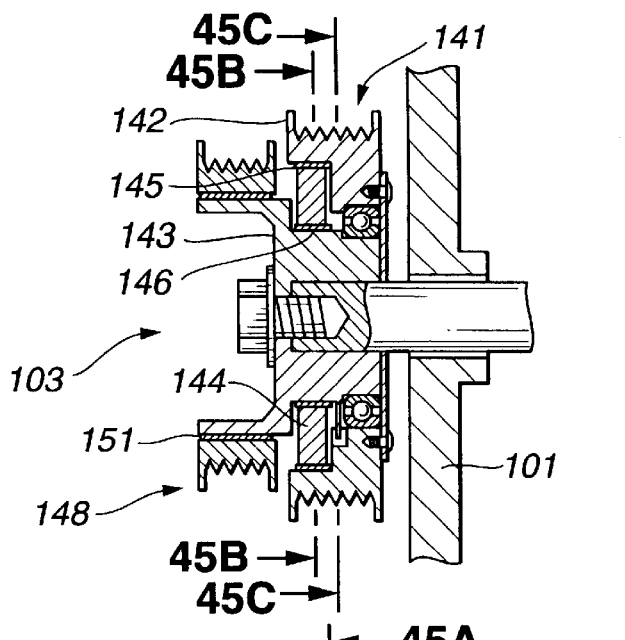
FIG. 45A is a cross-sectional view of a crank pulley used in an internal combustion engine provided with a fifteenth embodiment of the vibration reducing system according to the present invention, taken in the direction of arrows substantially along the line 45A—45A of FIGS. 45B and 45C.
Figure 45B:
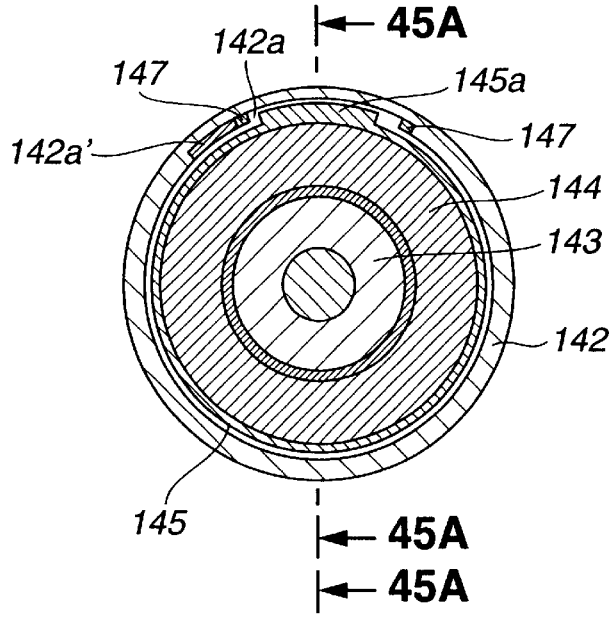
FIG. 45B is a cross-sectional view taken in the direction of arrows substantially along the line 45B—45B of FIG. 45A.
Figure 45C:
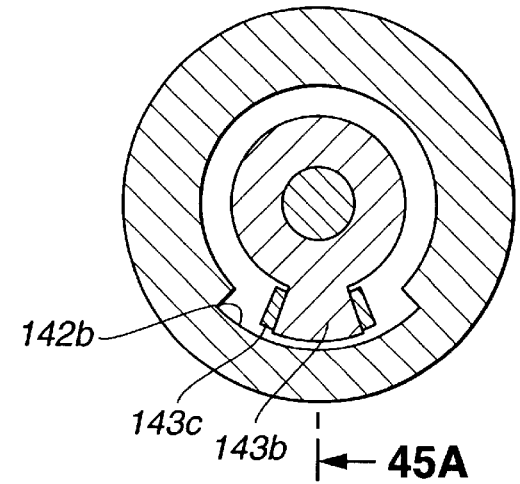
FIG. 45C is a cross-sectional view taken in the direction of arrows substantially along the line 45C—45C of FIG. 45A.

FIGS. 45A to 45C illustrate a fifteenth embodiment of the vibration reducing system of the present invention, similar to the eighth embodiment of FIG. 8 with the exception that the rotating section of the alternator is rotated in a direction opposite to the rotating direction of the crankshaft of the engine. In this embodiment, the crank pulley 141 located axially inside relative to the engine 101 is similar to that of the fourteenth embodiment so as to increase an effect of antiresonance for roll vibration of the engine.

Figure 46:
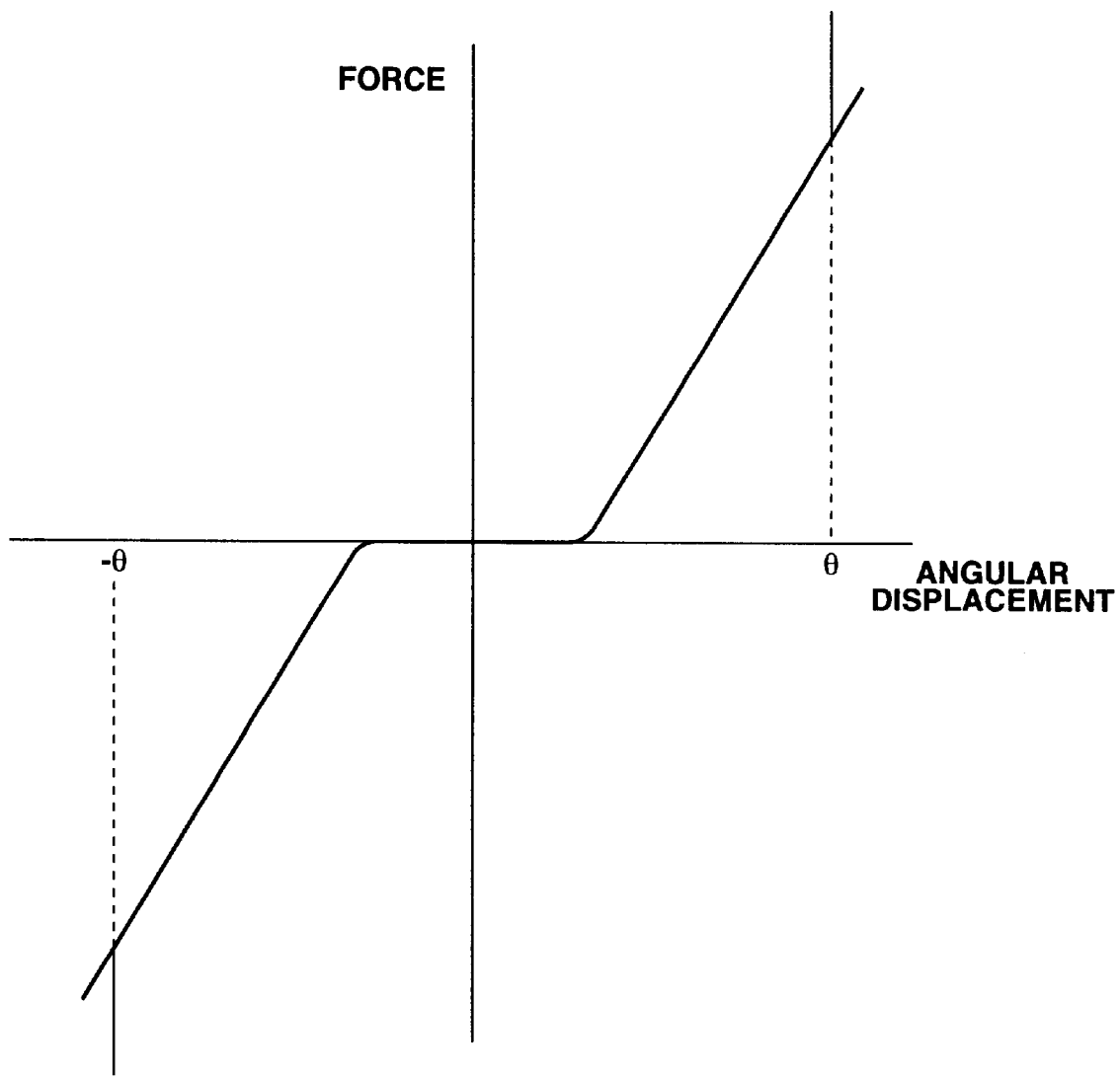
FIG. 46 is a graph showing the relationship between the rotational angular displacement and the spring force in connection with the fifteenth embodiment of the vibration reducing system.

As shown in FIGS. 45A to 45C, the crank pulley 141 is similar to that of the fourteenth embodiment and arranged as follows: A part of outer peripheral portion 142 of pulley 141 located axially inside (relative to the engine 101) the rubber layer 144 is recessed to provide stopper 142b. Inner peripheral portion 143 of pulley 141 is projected to provide stopper 143b facing the recess. These stoppers 142b, 143b restrict displacement at a value over a maximum angular displacement θ at the time of antiresonance. Additionally, rubber pieces 143c are attached to both sides of stopper 143b to suppress hammering sounds generated at the time of collision. It will be understood that the spring characteristics of the above arrangement is non-linear as shown in FIG. 46.

With the above arrangement, under the action of stoppers 142b, 143b, a hard spring is provided at engine speeds near those of resonance higher than those of antiresonance, so that a resonance point shifts toward a high engine speed side, as shown in FIG. 47, to enable further enlarging a region in which antiresonance is effective.

Further, one of stoppers 142a provided on outer peripheral portion 142 of pulley 141 may be formed with a replaceable member 142a' which is replaceable with a new one, thereby making it possible to modify a range of angular displacement where no spring function (zero in spring constant) is produced by stoppers 142a, 143a. By this, it is possible to use parts in common among various types of engines which are different in fundamental harmonic component because of differences in idling rotating speed, thus enabling reduction in cost.

The entire contents of Japanese Patent Applications Nos. P2000-088097 (filed Mar. 28, 2000) and P2000-293027 (Sep. 26, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A vibration reducing system for an internal combustion engine, comprising:
   an elastic member; and
   a rotating member driven through said elastic member by a rotating shaft of the engine;
   wherein when the engine is operated in a predetermined engine operating condition where an engine speed is generally constant, said elastic member antiresonates at a frequency of or harmonic of an antiresonance frequency within a range between a frequency of antiresonance for a rotational fluctuation of the rotating shaft of the engine and a frequency of antiresonance for a roll vibration of the engine.

2. A vibration reducing system as claimed in claim 1, wherein the antiresonance frequency is generally intermediate between the frequency of antiresonance for the rotational fluctuation and the frequency of antiresonance for the roll vibration.

3. A vibration reducing system as claimed in claim 1, wherein said rotating member is driven to rotate in a direction opposite to that of rotation of the rotating shaft of the engine.

4. A vibration reducing system as claimed in claim 1, wherein the engine is mounted on an automotive vehicle, wherein the predetermined engine operating condition is an idling engine operating condition.

5. A vibration reducing system as claimed in claim 4, wherein the automotive vehicle includes a device for detecting a driving condition of the vehicle, and a control unit adapted to change an engine speed in an idling engine operating condition in a manner that the antiresonance frequency is generally coincident with one of the frequency of antiresonance for the rotational fluctuation of the rotating shaft of the engine and the frequency of antiresonance for roll vibration of the engine, in response to the vehicle driving condition.

6. A vibration reducing system as claimed in claim 5, wherein said vibration reducing system comprises a device for detecting a first idling engine operating condition in which an accessory is operated to increase an engine load, and a device for detecting a second idling engine condition in which the accessory is not operated, wherein said control unit is adapted to control the engine speed in the idling engine operating condition in a manner that the antiresonance frequency is generally coincident with the frequency of antiresonance for the rotational fluctuation of the rotating shaft of the engine, in response to the first idling engine operating condition, and that the antiresonance frequency is generally coincident with the frequency of antiresonance for roll vibration of the engine, in response to the second idling engine operating condition.

7. A vibration reducing system as claimed in claim 5, wherein the vehicle includes an automatic transmission, wherein the vibration reducing system includes a device for detecting a first vehicle driving condition in which torque of the rotating shaft of the engine is transmitted through the automatic transmission to a drive shaft of a road wheel, and a second vehicle driving condition in which torque of the rotating shaft of the engine is not transmitted through the automatic transmission to the drive shaft, wherein said control unit is adapted to control the engine speed in the idling engine operating condition in a manner that the antiresonance frequency is generally coincident with the frequency of antiresonance for the rotational fluctuation of the rotating shaft of the engine, in response to the first vehicle driving condition, and that the antiresonance frequency is generally coincident with the frequency of antiresonance for roll vibration of the engine, in response to the second vehicle driving condition.

8. A vibration reducing system as claimed in claim 1, wherein the antiresonance frequency is proportional to a number of engine cylinders of the engine.

9. A vibration reducing system as claimed in claim 1, further comprising a drive rotational inertial mass member and a driven rotational inertial member corresponding to said rotating member, said drive and driven rotational inertial mass members being relatively rotatably connected through said elastic member, said drive and driven rotational inertial mass members and said elastic member constituting a rotational vibration system and forming part of a driving force transmitting mechanism through which a rotational driving force of the rotating shaft of the engine is transmittable, wherein antiresonance is generated in the rotational vibration system between vibration in the rotational vibration system and rotational vibration at a predetermined frequency range generated under operation of the engine, wherein a spring force of said elastic member has a non-linear characteristics relative to a relative rotational angular displacement between said drive and driven rotational inertial mass members, and wherein the spring force of said elastic member has a characteristics to increase with an increase in the relative rotational angular displacement.

10. A vibration reducing system as claimed in claim 9, wherein said elastic member has a spring constant smaller in a region smaller in rotational angular displacement than a maximum rotational angular displacement at a resonance point, than that in the maximum rotational angular displacement at the resonance point.

11. A vibration reducing system as claimed in claim 9, wherein said elastic member has a spring constant smaller in a region smaller in rotational angular displacement than a maximum rotational angular displacement at an antiresonance point, than that in the maximum rotational angular displacement at the antiresonance point.

12. A vibration reducing system as claimed in claim 11, wherein said elastic member has a spring constant which is larger in the maximum rotational angular displacement at the antiresonance point for rotational vibration in a low frequency range of rotational vibrations which are generated by said rotational vibration system under operation of the engine, than that in the region smaller in rotational angular displacement, the low frequency range being lower than a predetermined value.

13. A vibration reducing system as claimed in claim 9, wherein said elastic member has a spring constant which is about zero or smaller in a region lower in rotational angular displacement than a predetermined level, than that in a region higher in rotational angular displacement than the predetermined level.

14. A vibration reducing system as claimed in claim 13, wherein said elastic member includes a connecting section having an end portion for connection with at least one of said drive and driven inertial mass members, the end portion being assembled in a connecting section of the at least one of said drive and driven inertial mass members, with a clearance, wherein the spring constant of said elastic member is about zero or smaller in a first region smaller in rotational angular displacement than the clearance, than that in a second region larger in rotational angular displacement than the clearance.

15. A vibration reducing system as claimed in claim 14, wherein said elastic member is formed of a wire material and formed into a spiral shape or coil shape, the end portion of the connecting section of said elastic member being engaged with the connecting section of one of said drive and driven inertial mass members.

16. A vibration reducing system as claimed in claim 14, further comprising an elastomeric member disposed in at least a part of the clearance, said elastomeric member having a spring constant smaller than that in the region larger in rotational angular displacement than the clearance.

17. A vibration reducing system as claimed in claim 9, wherein the spring force of said elastic member has a generally linear characteristics in a region smaller in rotational angular displacement than a predetermined level, wherein said vibration reducing system further comprises a stopper for restricting an increase in rotational angular displacement over the predetermined level.

18. A vibration reducing system as claimed in claim 17, wherein the rotational angular displacement takes a maximum rotational angular displacement at the antiresonance point for rotational vibration in a high frequency range of rotational vibrations which are generated by said rotational vibration system under operation of the engine, smaller than the predetermined level, the high frequency range being higher than a predetermined value.

19. A vibration reducing system as claimed in claim 17, wherein said stopper has a contact surface at which the increase in rotational angular displacement over the predetermined level is restricted, wherein said vibration reducing system further comprises an elastic piece secured to the contact surface.

20. A vibration reducing system for an internal combustion engine, comprising:

a rotational vibration system including an elastic member, and a rotating member driven through said elastic member by a rotating shaft of the engine, said rotational vibration system generating resonance having a frequency of antiresonance; and wherein said elastic member and said rotating member are arranged to select the frequency of resonance in a manner that when the engine is operated in a predetermined engine operating condition where an engine speed is generally constant, the frequency of antiresonance is within a range between a frequency of antiresonance for a rotational fluctuation of the rotating shaft of the engine and a frequency of antiresonance for a roll vibration of the engine.

21. A method of reducing vibration in an internal combustion engine, comprising:

rotating a first member of an auxiliary device by the engine; and rotating a second member of the auxiliary device by an elastic member positioned between the first member and the second member, wherein the elastic member has a frequency of antiresonance within a range substantially between:
a frequency of antiresonance for a rotational fluctuation of rotating shaft, and
a frequency of antiresonance for a roll vibration of the engine.

22. The method as claimed in claim 21, wherein the elastic member has a frequency of antiresonance intermediate of the frequency of antiresonance for a rotational fluctuation of the rotating shaft and the frequency of antiresonance for a roll vibration of the rotating shaft.

* * * * *